(12) United States Patent
Zhu et al.

(10) Patent No.: US 12,415,566 B2
(45) Date of Patent: Sep. 16, 2025

(54) STEERING MECHANISM, VEHICLE, AND APPARATUS AND METHOD FOR PRODUCING STEERING MECHANISM

(71) Applicant: CONTEMPORARY AMPEREX TECHNOLOGY (HONG KONG) LIMITED, Hong Kong (CN)

(72) Inventors: Tingting Zhu, Ningde (CN); Liwen Jiang, Ningde (CN); Zhichao Wang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 896 days.

(21) Appl. No.: 17/559,784

(22) Filed: Dec. 22, 2021

(65) Prior Publication Data
US 2022/0144337 A1    May 12, 2022

Related U.S. Application Data

(63) Continuation of application No. PCT/CN2020/127375, filed on Nov. 7, 2020.

(51) Int. Cl.
*B62D 5/09* (2006.01)
*B62D 5/06* (2006.01)
*B62D 15/02* (2006.01)

(52) U.S. Cl.
CPC .............. *B62D 5/09* (2013.01); *B62D 5/062* (2013.01); *B62D 15/024* (2013.01)

(58) Field of Classification Search
CPC ........ B62D 5/09; B62D 5/062; B62D 5/0418; B62D 5/12; B62D 15/024; B62D 9/00; B62D 7/00; B62D 7/09
See application file for complete search history.

(56) References Cited

U.S. PATENT DOCUMENTS 3,905,438 A * 9/1975 Runyon .................. B62D 5/09
                                              180/433
5,435,407 A    7/1995 Renfroe
(Continued)

FOREIGN PATENT DOCUMENTS

CN       101631711 A     1/2010
CN       107458459 A    12/2017
(Continued)

OTHER PUBLICATIONS

Notice of Reasons for Refusal dated Sep. 4, 2023 received in Japanese Patent Application No. JP 2022-554366.
(Continued)

*Primary Examiner* — Valentin Neacsu
*Assistant Examiner* — Abigail R Hymel
(74) *Attorney, Agent, or Firm* — Scully, Scott, Murphy & Presser, P.C.

(57) ABSTRACT

The present application provides a steering mechanism, a vehicle, and an apparatus and method for producing a steering mechanism, and belongs to the technical field of vehicles. Wherein the steering mechanism comprises a first directive wheel, a second directive wheel, a first driving device, and a second driving device. The first driving device is connected to the first directive wheel; and the second driving device is connected to the second directive wheel. The first driving device and the second driving device are configured to separately drive the first directive wheel and the second directive wheel respectively, thus making the first directive wheel and the second directive wheel deflect in the same direction to achieve steering. No linkage relationship exists between the two directive wheels, whereby the two directive wheels do not need to be connected through a complex mechanical transmission mechanism, and a structure of the steering mechanism is simplified.

10 Claims, 12 Drawing Sheets

(56) References Cited

U.S. PATENT DOCUMENTS

| | | | |
|---|---|---|---|
| 5,653,304 A | | 8/1997 | Renfroe |
| 10,093,130 B1 * | | 10/2018 | Garduno ............... B60B 29/003 |
| 10,569,802 B2 | | 2/2020 | Tokioka et al. |
| 2010/0075727 A1 * | | 3/2010 | Coers ................. B60B 35/1054 |
| | | | 280/42 |
| 2015/0137471 A1 * | | 5/2015 | Smith ...................... B62D 9/00 |
| | | | 280/93.502 |
| 2018/0093707 A1 | | 4/2018 | Tokioka et al. |
| 2019/0263448 A1 * | | 8/2019 | Lukka .................... B62D 13/04 |
| 2021/0403082 A1 * | | 12/2021 | Funke ................... B62D 6/001 |
| 2022/0097704 A1 * | | 3/2022 | Collins ................... B60K 1/02 |

FOREIGN PATENT DOCUMENTS

| | | | |
|---|---|---|---|
| CN | 107914764 A | | 4/2018 |
| CN | 207225462 U | | 4/2018 |
| CN | 110435760 A | | 11/2019 |
| JP | S6085063 A | | 5/1985 |
| JP | S61268571 A | | 11/1986 |
| JP | 2002532323 A | | 10/2002 |
| JP | 2006240413 A | | 9/2006 |
| JP | 2006327571 A | | 12/2006 |

OTHER PUBLICATIONS

Extended European Search Report dated Jun. 17, 2022 received in European Patent Application No. EP 20938519.4.
Notification of Registration Procedure dated Dec. 11, 2204 received in Chinese Patent Application No. 202080102697.7.

* cited by examiner

STEERING MECHANISM, VEHICLE, AND APPARATUS AND METHOD FOR PRODUCING STEERING MECHANISM

CROSS-REFERENCE TO RELATED APPLICATIONS

This application is a continuation of International Application No. PCT/CN2020/127375, filed on Nov. 7, 2020, the disclosure of which is hereby incorporated by reference in its entirety.

TECHNICAL FIELD

The present application relates to the technical field of vehicles, an in particular to a steering mechanism, a vehicle, and an apparatus and method for producing a steering mechanism.

BACKGROUND

A steering mechanism of an existing vehicle is mainly divided into two types, the first type is a mechanical hydraulic steering mechanism, a hydraulic pump is driven through an engine belt, then pressure difference of hydraulic oil flowing into two ends of a power cylinder is controlled through a valve body, a piston is pulled to move, the piston is connected to a power connecting rod to transfer force to wheels to achieve left-right steering, and the mechanical hydraulic steering mechanism is mainly applied to a traditional fuel oil vehicle; and another type is that steering is controlled through electric power assistance, an electric machine, together with a clutch and a reduction gear, is installed on a frame, and the steering is achieved by assisting a mechanical power transmission rod by the motor.

In general, linkage of two directive wheels in a steering mechanism is achieved through a complex linkage mechanism, and the whole steering mechanism structure is relatively complex.

SUMMARY

Embodiments of the present application provide a steering mechanism, a vehicle, and an apparatus and method for producing the steering mechanism, thus improving the problem that the steering mechanism is complex in structure.

In the first aspect, the embodiments of the present application provide a steering mechanism, comprising:
a first directive wheel;
a second directive wheel;
a first driving device connected to the first directive wheel; and
a second driving device connected to the second directive wheel;
where the first driving device and the second driving device are configured to separately drive the first directive wheel and the second directive wheel respectively, thus making the first directive wheel and the second directive wheel deflect in the same direction to achieve steering.

In the above solution, due to the fact that the first directive wheel and the second directive wheel are separately driven by the first driving device and the second driving device respectively to deflect in the same direction, no linkage relationship exists between the two directive wheels, whereby the two directive wheels do not need to be connected through a complex mechanical transmission mechanism, and a structure of the steering mechanism is simplified.

In addition, the steering mechanism provided by the embodiments of the present application also has the following additional technical features:

In some embodiments, the first driving device includes:
two first hydraulic cylinders distributed at the same side of the first directive wheel at interval, where one first hydraulic cylinder is configured to push the first directive wheel, and another first hydraulic cylinder is configured to pull the first directive wheel, thus driving the first directive wheel to deflect.

In the above solution, the first directive wheel is driven to deflect by the two first hydraulic cylinders in a push-and-pull manner, the two first hydraulic cylinders may provide a larger steering force for the first directive wheel, and meanwhile the first directive wheel is more stable in the deflection steering process.

In some embodiments, the second driving device includes:
two second hydraulic cylinders distributed at the same side of the second directive wheel at interval, where one second hydraulic cylinder is configured to push the second directive wheel, and another second hydraulic cylinder is configured to pull the second t directive wheel, thus driving the second directive wheel to deflect.

In the above solution, the second directive wheel is driven to deflect by the two second hydraulic cylinders in a push-and-pull manner, the two second hydraulic cylinders may provide larger steering force for the second directive wheel, and meanwhile the second directive wheel is more stable in the deflection steering process.

In some embodiments, the two first hydraulic cylinders include a first front hydraulic cylinder and a first rear hydraulic cylinder, the two second hydraulic cylinder includes a second front hydraulic cylinder and a second rear hydraulic cylinder, and the first front hydraulic cylinder, the first rear hydraulic cylinder, the second front hydraulic cylinder, and the second rear hydraulic cylinder are all located between the first directive wheel and the second directive wheel;
when the first directive wheel and the second directive wheel deflect leftwards in the same direction, the first front hydraulic cylinder is configured to push the first directive wheel, the first rear hydraulic cylinder is configured to pull the first directive wheel, the second front hydraulic cylinder is configured to pull the second directive wheel, and the second rear hydraulic cylinder is configured to push the second directive wheel;
when the first directive wheel and the second directive wheel deflect rightwards in the same direction, the first front hydraulic cylinder is configured to pull the first directive wheel, the first rear hydraulic cylinder is configured to push the first directive wheel, the second front hydraulic cylinder is configured to push the second directive wheel, and the second rear hydraulic cylinder is configured to pull the second directive wheel.

In the above solution, due to the fact that the first front hydraulic cylinder, the first rear hydraulic cylinder, the second front hydraulic cylinder, and the second rear hydraulic cylinder are all located between the first directive wheel and the second directive wheel, the steering mechanism is compact in structure, and the occupied space is reduced.

In some embodiments, the steering mechanism further includes:

a hydraulic control system configured to supply liquid to the first driving device and the second driving device, thus making the first driving device and the second driving device separately drive the first directive wheel and the second directive wheel respectively, and making the first directive wheel and the second directive wheel deflect in the same direction.

In the above solution, the liquid is supplied to the first driving device and the second driving device through the hydraulic control system, and thus the accurate control for controlling the first driving device and the second device may be achieved to make the first directive wheel and the second directive wheel deflect in the same direction. It should be understood that the first driving device and the second driving device are hydraulic execution devices, and the first driving device and the second driving device may provide larger driving force for the first directive wheel and the second directive wheel under the action of the hydraulic control system.

In some embodiments, the hydraulic control system includes:

a steering control device having a first working state and a second working state;

a steering part in transmission connection with the steering control device, where the steering part is configured to control the steering control device to switch between the first working state and the second working state; and a liquid supply device configured to supply liquid to the first driving device and the second driving device when the steering control device is in the first working state, thus making the first driving device and the second driving device respectively drive the first directive wheel and the second directive wheel to deflect leftwards in the same direction, and is also configured to supply liquid to the first driving device and the second driving device when the steering control device is in the second working state, thus making the first driving device and the second driving device respectively drive the first directive wheel and the second directive wheel to deflect rightwards in the same direction.

In the above solution, the steering control device may be controlled by the steering part to make the steering control device be in the first working state or the second working state and make the liquid supply device supply liquid to the first driving device and the second driving device, and same-direction leftwards deflection or same-direction rightwards deflection of the first directive wheel and the second directive wheel is achieved. The hydraulic control system with such structure may achieve steering by operating the steering part, the overall structure is simple, and a steering operation is convenient.

In some embodiments, the hydraulic control system further includes:

a flow divider valve, where the liquid supplied by the liquid supply device flows into the first driving device and the second driving device through the flow divider valve and the steering control device in sequence; the flow divider valve is configured to regulate a proportion of flow of the liquid flowing into the first driving device from the steering control device to flow of the liquid flowing into the second driving device from the steering control device, thus making a deflection angle of the first directive wheel be the same as or different from a deflection angle of the second directive wheel.

In the above solution, the proportion of the flow of the liquid flowing into the first driving device from the steering control device to the flow of the liquid flowing into the second driving device from the steering control device may be regulated through the flow divider valve. In an actual traveling process, the proportion of the flow of the liquid flowing into the first driving device to the flow of the liquid flowing into the second driving device may be controlled through the flow divider valve according to a specific driving condition, thus making the deflection angles of the first directive wheel and the second directive wheel in the steering process be the same or different, and the control performance and the driving feeling are improved.

In some embodiments, the hydraulic control system further includes:

a flow regulating valve, where the liquid supplied by the liquid supply device flows into the first driving device and the second driving device through the flow regulating valve, the flow divider valve, and the steering control device in sequence;

a vehicle speed sensor for acquiring a vehicle speed signal of a vehicle; and a control unit for controlling the flow regulating valve to regulate the flow of the liquid flowing into the flow divider valve according to the vehicle speed signal.

In the above solution, the vehicle speed signal of the vehicle may be acquired through the vehicle speed sensor, the flow regulating valve may be controlled according to the vehicle speed signal control unit to regulate the flow of the liquid flowing into the flow divider valve. If the flow of the liquid flowing into the flow divider valve is changed, the flow of the liquid flowing into the first driving device and the second driving device through the flow divider valve and the steering control device in sequence is also changed, thus changing the driving force provided for the first directive wheel and the second directive wheel by the first driving device and the second driving device respectively.

In some embodiments, the hydraulic control system further includes:

a torque sensor for acquiring a torque signal of the steering part;

and the control unit is also configured to control the flow regulating valve to regulate the flow of liquid flowing into the flow divider valve according to the torque signal.

In the above solution, the torque signal of the steering part may be acquired through the torque sensor, and the flow regulating valve may be controlled according to the torque signal control unit to regulate the flow of the liquid flowing into the flow divider valve. If the flow of the liquid flowing into the flow divider valve is changed, the flow of the liquid flowing into the first driving device and the second driving device through the flow divider valve and the steering control device in sequence is also changed, thus changing the driving force provided for the first directive wheel and the second directive wheel by the first driving device and the second driving device respectively. When the torque applied to the steering part by a driver in the steering process of the steering part is greater than a preset value, the torque sensor may acquire a torque signal representing the magnitude of the torque applied to the steering part, and the control unit is configured to control the flow regulating valve to increase the flow of the liquid flowing into the flow divider valve, and the first driving device and the second driving device are ultimately configured to respectively provide larger driving force for the first directive wheel and the second directive wheel to make the first directive wheel and the second directive wheel deflect at a relatively high speed; when the torque applied to the steering part by a driver in the steering process of the steering piece is less than a preset value, the torque sensor may acquire a torque signal representing the magnitude of the torque applied to the steering part, and the flow regulating valve is controlled by the control unit to reduce the flow of the liquid flowing into the flow divider valve, and the first driving device and the second driving device are ultimately configured to respectively provide lesser driving force for the first directive wheel and the second directive wheel to make the first directive wheel and the second directive wheel deflect at a relatively slow speed.

In some embodiments, the steering control device includes:

a first reversing valve connected to the first driving device through a first pipeline and a second pipeline; and a second reversing valve communicated with the second driving device through a third pipeline and a fourth pipeline;

where the steering part is configured to switch positions of a valve core of the first reversing valve and a valve core of the second reversing valve, thus making the steering control device be in a first working state or a second working state;

when the steering control device is in the first working state, the first pipeline and the third pipeline are liquid inlet pipelines, and the second pipeline and the fourth pipeline are liquid return pipelines;

and when the steering control device is in the second working state, the first pipeline and the third pipeline are liquid return pipelines, and the second pipeline and the fourth pipeline are liquid inlet pipelines.

In the above solution, liquid inlet and outlet conditions of the first driving device and the second driving device are respectively changed through the first reversing valve and the second reversing valve, thus achieving the deflection of the first directive wheel and the second directive, and this steering control device is simple in structure.

In some embodiments, the first driving device includes:

two first hydraulic cylinders distributed at the same side of the first directive wheel at interval, where a piston rod of each first hydraulic cylinder is connected to the first directive wheel, each first hydraulic cylinder includes a first cavity into which the liquid is fed to make the piston rod extend out and a second cavity into which the liquid is fed to make the piston rod retract;

where the first cavity of one first hydraulic cylinder and the second cavity of another first hydraulic cylinder are communicated with the first pipeline, and the second cavity of the one first hydraulic cylinder and the first cavity of the another first hydraulic cylinder are communicated with the second pipeline.

In the above solution, if the first pipeline is fed with liquid, the first cavity of one first hydraulic cylinder and the second cavity of another first hydraulic cylinder are fed with liquid, the piston rod of one first hydraulic cylinder extends out to apply thrust to the first directive wheel, and the piston rod of another first hydraulic cylinder retracts to apply tensile force to the first directive wheel; if the second pipeline is fed with liquid, the second cavity of one first hydraulic cylinder and the first hydraulic cylinder of another first hydraulic cylinder are fed with liquid, the piston rod of one first hydraulic cylinder retracts to apply tensile force on the first directive wheel, and the piston rod of another first hydraulic cylinder extends out to apply thrust to the first directive wheel. That is, whether the first pipeline or the second pipeline is fed with liquid, the two first hydraulic cylinders are configured to drive the first directive wheel to defect in a push-and-pull manner, a larger steering force may be provided for the first directive wheel, and meanwhile, the first directive wheel is more stable in the deflection steering process.

In some embodiments, the second driving device includes:

two second hydraulic cylinders distributed at the same side of the second directive wheel at interval, where a piston rod of each second hydraulic cylinder is connected to the second directive wheel, each second hydraulic cylinder includes a third cavity into which the liquid is fed to make the piston rod extend out and a fourth cavity into which the liquid is fed to make the piston rod retract;

where the third cavity of one second hydraulic cylinder and the fourth cavity of another second hydraulic cylinder are communicated with the third pipeline, and the fourth cavity of the one second hydraulic cylinder and the third cavity of another second hydraulic cylinder are communicated with the fourth pipeline.

In the above solution, if the third pipeline is fed with liquid, the third cavity of one second hydraulic cylinder and the fourth cavity of another second hydraulic cylinder are fed with liquid, the piston rod of one second hydraulic cylinder extends out to apply thrust to the second directive wheel, and the piston rod of another second hydraulic cylinder retracts to apply tensile force to the second directive wheel; if the fourth pipeline is fed with liquid, the fourth cavity of one second hydraulic cylinder and the third hydraulic cylinder of another second hydraulic cylinder are fed with liquid, the piston rod of one second hydraulic cylinder retracts to apply tensile force on the second directive wheel, and the piston rod of another second hydraulic cylinder extends out to apply thrust to the second directive wheel. That is, whether the third pipeline or the fourth pipeline is fed with liquid, the two second hydraulic cylinders are configured to drive the second directive wheel to defect in a push-and-pull manner, a larger steering force may be provided for the second directive wheel, and meanwhile, the second directive wheel is more stable in the deflection steering process.

In a second aspect, the embodiments of the present application provide a vehicle, including the steering mechanism.

In the above solution, the steering mechanism of the vehicle separately drives the first directive wheel and the second directive wheel to deflect in the same direction respectively through the first driving device and the second driving device, no linkage relationship exists between the two directive wheels, whereby the two directive wheels do not need to be connected through a complex mechanical transmission mechanism, a structure of the steering mechanism is simplified, and thus the total weight and the space occupation of the vehicle are reduced.

In a third aspect, the embodiments of the present application provide an apparatus for producing a steering mechanism, where the apparatus for producing the steering mechanism includes:

a providing device for providing a first directive wheel, a second directive wheel, a first driving device, and a second driving device; and an installing device for installing the first directive wheel and the second directive wheel on the first driving device and the second driving device respectively;

where the first driving device and the second driving device are configured to separately drive the first directive wheel and the second directive wheel respectively, thus making the first directive wheel and the second directive wheel deflect in the same direction to achieve steering.

In a fourth aspect, the embodiments of the present application provide a method for producing a steering mechanism, where the method for producing the steering mechanism includes:

providing a first directive wheel, a second directive wheel, a first driving device, and a second driving device;

installing the first directive wheel on the first driving device;

and installing the second directive wheel on the second driving device;

where the first driving device and the second driving device are configured to separately drive the first directive wheel and the second directive wheel respectively, thus making the first directive wheel and the second directive wheel deflect in the same direction to achieve steering.

BRIEF DESCRIPTION OF DRAWINGS

To describe the technical solutions in the embodiments of the present application more clearly, the following briefly introduces the accompanying drawings required for describing the embodiments of the present application. Apparently, the accompanying drawings in the following description show merely some embodiments of the present application, and those of ordinary skill in the art may still derive other drawings from these accompanying drawings without creative efforts.

Figure 1:
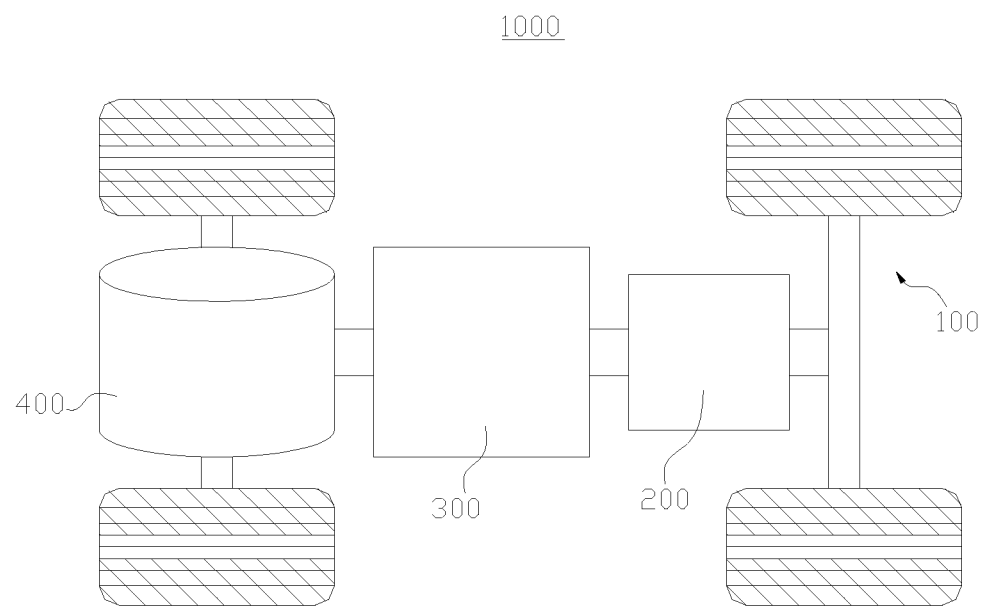
FIG. 1 is a structure diagram of a vehicle provided by some embodiments of the present application.

Numeral description: 10—first directive wheel, 11—first wheel, 12—first connecting frame, 13—first rotating shaft, 20—second directive wheel, 21—second wheel, 22—second connecting frame, 23—second rotating shaft, 30—first driving device, 31—first hydraulic cylinder, 311—first cavity, 312—second cavity, 32—first front hydraulic cylinder, 33—first rear hydraulic cylinder, 40—second driving device, 41—second hydraulic cylinder, 411—third cavity, 412—fourth cavity, 42—second front hydraulic cylinder; 43—second rear hydraulic cylinder; 50—hydraulic control system; 51—steering control device; 511—first reversing valve; 5111—first pipeline; 5112—second pipeline; 512—second reversing valve; 5121—third pipeline; 5122—fourth pipeline; 52—steering part; 53—liquid supply device; 531—hydraulic pump; 532—liquid storage tank; 533—driving motor; 54—flow divider valve; 541—pipe; 542—connecting pipe; 55—flow regulating valve; 56—vehicle speed sensor; 57—control unit; 58—torque sensor; 60—frame; 100—steering mechanism; 200—battery; 300—controller; 400—motor; 1000—vehicle; 1100—providing device; 1200—installing device; 2000—apparatus for producing steering mechanism.

DESCRIPTION OF EMBODIMENTS

The embodiments of the present application are further described in detail below with reference to the accompanying drawings and the embodiments. The following detailed description of the embodiments and the accompanying drawings are provided to illustrate the principles of the present application and are not intended to limit the scope of the present application, that is, the present application is not limited to the described embodiments.

In the description of the present application, it should be noted that, unless otherwise specified, "a plurality" means two or more; an orientation or positional relationship indicated by the terms "upper," "lower," "left," "right," "inner," "outer," and the like is merely for convenience in describing the present application and simplifying the description rather than indicating or implying that the referenced devices or elements must have a particular orientation, be constructed and operated in a particular orientation, and thus should not be construed as limiting the present application. In addition, the terms "first", "second", "third" and the like are used for descriptive purposes only and are not to be construed as indicating or implying relative importance. "Vertical" is not strictly vertical, but within the tolerance range. "Parallel" is not strictly parallel, but within the tolerance range.

The directional terms in the following description are all directions shown in the drawings, and are not intended to limit the specific structure of the present application. In the description of the present application, it also should to be noted that, unless otherwise explicitly specified or limited, the terms "installed," "connected," and "connection" are to be construed broadly, for example, either a fixed connection, a detachable connection, or an integral connection; direct connection or indirect connection through an intermediate. The specific meaning of the above terms in the present application may be understood as appropriate by those of ordinary skill in the art.

At present, linkage of two directive wheels in a steering mechanism of a vehicle is generally achieved through a complex linkage mechanism, and the whole steering mechanism structure is relatively complex.

In view of this, the present application provides a technical solution to achieve steering by separately driving two directive wheels to deflect in the same direction through two driving devices.

It should be noted that the technical solutions described by the embodiments of the present application are all suitable for the vehicle, the vehicle may be a fuel oil vehicle, a gas vehicle, or a new energy vehicle, and the new energy vehicle may be a battery electric vehicle, a hybrid electric vehicle, or a range-extended electric vehicle. The embodiments of the present application are not particularly limited to the vehicle.

For convenience of illustration, the following examples are illustrated with the vehicle as a new energy vehicle.

Please refer to FIG. 1, FIG. 1 is a structure diagram of a vehicle 1000 provided by some embodiments of the present application, the vehicle 1000 includes a steering mechanism 100 and achieves steering through the steering mechanism 100.

In some embodiments, the vehicle 1000 further includes a battery 200, and the battery 200 may be arranged at the bottom or head or tail of the vehicle 1000. The battery 200 may be configured to supply power of the vehicle 1000, for example, the battery 200 may serve as an operational power source of the vehicle 1000.

The vehicle 1000 may further include a controller 300 and a motor 400; the controller 300 is configured to control the battery 200 to supply power for the motor 400, for example, for operating power needs during startup, navigation, and driving of the vehicle 1000.

In some embodiments, the battery 200 may not only serve as an operational power source of the vehicle 1000, but also as a driving power source of the vehicle 1000, to provide driving power for the vehicle 1000 instead of or partially instead of fuel oil or natural gas.

The battery 200 provided by the embodiments of the present application refers to a single physical module including one or more battery cells to provide higher voltage or capacity. For example, the battery 200 mentioned in the present application may include a battery module, or a battery pack and the like. The battery 200 generally includes a box body for packaging one or more battery cells, and the box body may prevent liquid or other foreign matters from affecting charging or discharging of the battery cell.

In the present application, the battery cell may include a lithium-ion secondary battery, a lithium-ion primary battery, a lithium-sulfur battery, a sodium-lithium-ion battery, a sodium-ion battery, or a magnesium-ion battery and the like, which is not limited in the embodiments of the present application. The battery cell may be cylindrical, flat, rectangular, or other shapes, which is also not limited in the embodiments of the present application. In general, the battery cell is divided into three types according to a package mode: cylindrical battery cells, square battery cells, and soft package battery cells, which is also not limited in the embodiments of the application.

The battery cell includes an electrode assembly and an electrolyte, and the electrode assembly is composed of a positive plate, a negative plate, and a separator. The battery cell works mainly on the movement of metal ions between the positive plate and the negative plate. The positive plate includes a positive current collector and a positive active material layer, the positive active material layer is coated on a surface of the positive current collector, and the current collector uncoated with the positive active material layer protrudes out of the current collector coated with the positive active material layer, and the current collector uncoated with the positive electrode active material layer serves as a positive electrode tab. Taking the lithium ion battery as an example, the positive current collector may be made of aluminum, and the positive active material may be lithium cobalt oxide, lithium iron phosphate, ternary lithium, or lithium manganate. The negative plate includes a negative current collector and a negative active material layer, the negative active material layer is coated on a surface of the negative current collector, and the current collector uncoated with the negative active material layer protrudes out of the current collector coated with the negative active material layer, and the current collector uncoated with the negative electrode active material layer serves as a negative electrode tab. The negative current collector may be made of copper, and the negative active material may be carbon or silicon. To guarantee that fusing does not occur while a large current passes through, a plurality of positive electrode tabs are stacked together, and a plurality of negative electrode tabs are stacked together. The separator may be made of PP, or PE, and the like. In addition, the electrode assembly may be a wound structure or may be a laminated structure, and embodiments of the present application are not limited thereto.

Figure 2:
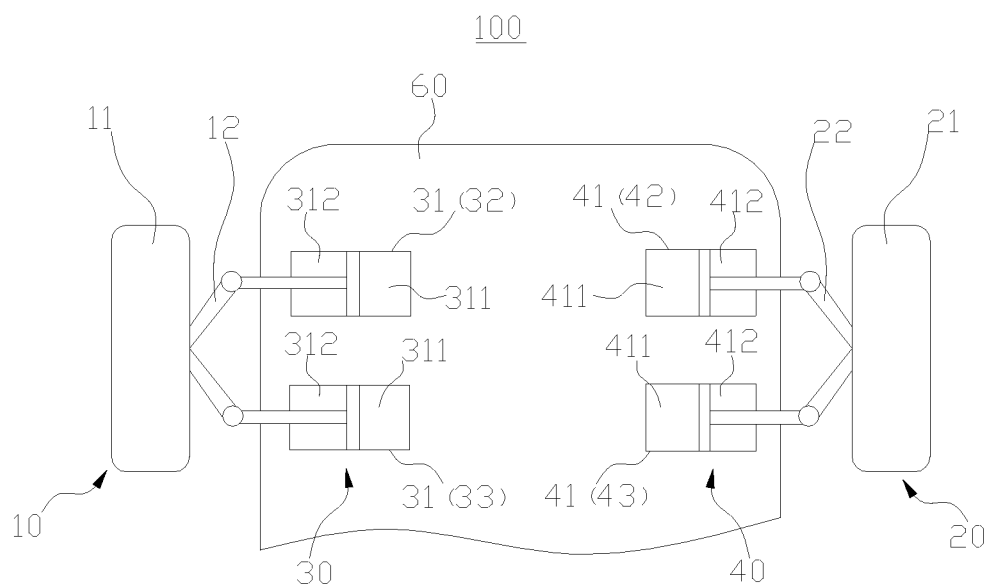
FIG. 2 is a structure diagram of a steering mechanism (in which a first directive wheel and a second directive wheel are undeflected) provided by some embodiments of the present application.
Figure 3:
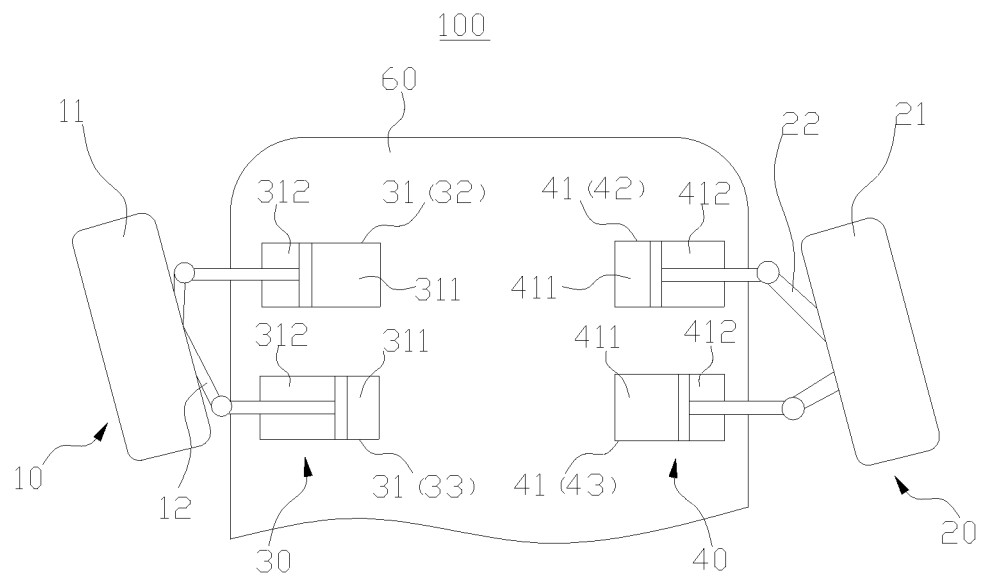
FIG. 3 is structure diagram of a steering mechanism (in which a first directive wheel and a second directive wheel are deflected leftwards) provided by some embodiments of the present application.
Figure 4:
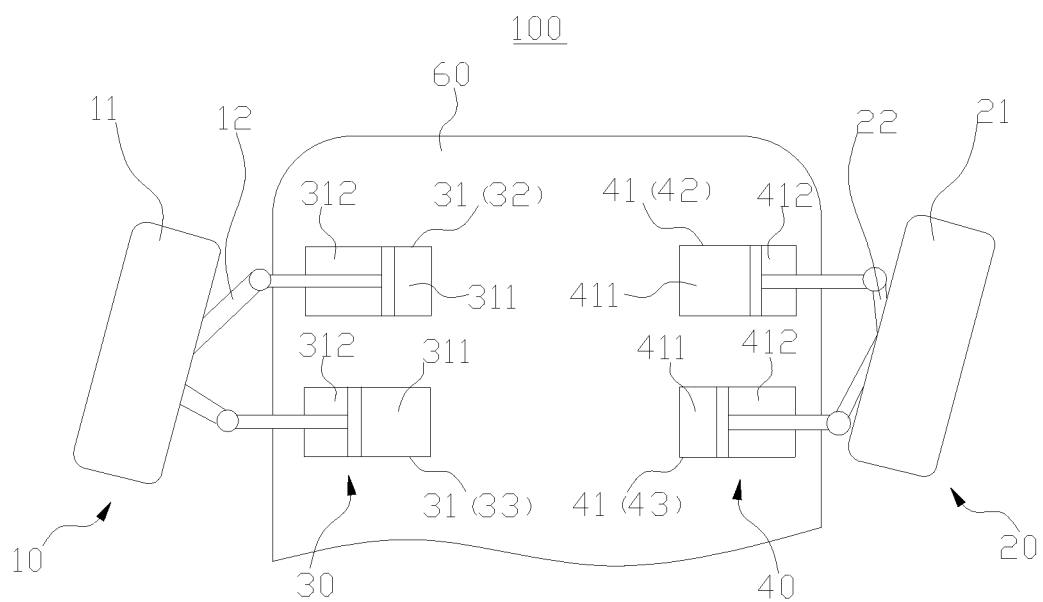
FIG. 4 is a steering mechanism (in which a first directive wheel and a second directive wheel are deflected rightwards) provided by some embodiments of the present application.

Please refer to FIG. 2 to FIG. 4, FIG. 2 is a structure diagram of a steering mechanism 100 (in which a first directive wheel 10 and a second directive wheel 20 are undeflected) provided by some embodiments of the present application, FIG. 3 is a structure diagram of a steering mechanism 100 (in which a first directive wheel 10 and a second directive wheel 20 are deflected leftwards) provided by some embodiments of the present application, and FIG. 4 is a structure diagram of a steering mechanism 100 (in which a first directive wheel 10 and a second directive wheel 20 are deflected rightwards) provided by some embodiments of the present application. The steering mechanism 100 provided by the embodiments of the present application includes a first directive wheel 10, a second directive wheel 20, a first driving device 30, and a second driving device 40. The first driving device 30 is connected to the first directive wheel 10; and the second driving device 40 is connected to the second directive wheel 20. The first driving device 30 and the second driving device 40 are configured to separately drive the first directive wheel 10 and the second directive wheel 20 respectively, thus making the first directive wheel 10 and the second directive wheel 20 deflect in the same direction to achieve steering.

In the steering mechanism 100, due to the fact that the first directive wheel 10 and the second directive wheel 20 are separately driven by the first driving device 30 and the second driving device 40 respectively to deflect in the same direction, no linkage relationship exists between the two directive wheels, whereby the two directive wheels do not need to be connected through a complex mechanical transmission mechanism, and a structure of the steering mechanism 100 is simplified.

In addition, due to the fact that the first driving device 30 and the second driving device 40 may separately control the first directive wheel 10 and the second directive wheel 20 respectively, the first directive wheel 10 and the second directive wheel 20 are mutually independent and non-interference in the steering process; in the steering process, an deflection angle of the first directive wheel 10 driven by the first driving device 30 and a deflection angle of the second directive wheel 20 driven by the second driving device 40 may be the same or different, and the steering operability of the steering mechanism 100 is improved.

The steering mechanism 100 may further includes a frame 60, the first driving device 30 and the second driving device 40 may be installed on the frame 60 to stably fix the first directive wheel 10 and the second directive wheel 20 to the frame 60. In the steering process of the vehicle 1000, the first directive wheel 10 and the second directive wheel 20 may be viewed as deflecting relative to the frame 60. In the FIG. 2, FIG. 3, and FIG. 4, the first directive wheel 10 is located at the left side of the second directive wheel 20.

Where the first directive wheel 10 may include a first wheel 11 and a first connecting frame 12; the first wheel 11 is rotatably arranged on the first connecting frame 12, the first wheel 11 is able to rotate around its own axis relative to the first connecting frame 12, the first driving device 30 is connected onto the first connecting frame 12, and when the first driving device 30 drives the first connecting frame 12 to deflect, the first wheel 11 is to deflect along with the first connecting frame 12, thus achieving deflection of the first directive wheel 10.

The second directive wheel 20 may include a second wheel 21, and a second connecting frame 22; the second wheel 21 is rotatably arranged on the first connecting frame 22, the second wheel 21 is able to rotate around its own axis relative to the second connecting frame 22, the second driving device 40 is connected onto the second connecting frame 22, and when the second driving device 40 drives the second connecting frame 22 to deflect, the second wheel 21 is to deflect along with the first connecting frame 22, thus achieving deflection of the second directive wheel 20.

In some embodiments, please continue to refer to FIG. 2 to FIG. 4, the first driving device 30 may include two first hydraulic cylinders 31 which are distributed at the same side of the first directive wheel 10 at interval, where one first hydraulic cylinder 31 is configured to push the first directive wheel 10, and another first hydraulic cylinder 31 is configured to pull the first directive wheel 10, thus driving the first directive wheel 10 to deflect.

The first directive wheel 10 is driven to deflect by the two first hydraulic cylinders 31 in a push-and-pull manner, the two first hydraulic cylinders 31 may provide a larger steering force for the first directive wheel 10, and thus the first directive wheel 10 is more stable in the deflection steering process.

Where, for convenience in description, the two first hydraulic cylinders 31 are respectively defined as a first front hydraulic cylinder 32 and a first rear hydraulic cylinder 33. It should be understood that the two first hydraulic cylinders 31 are arranged one behind the other, the first front hydraulic cylinder 32 is located at the front side of the first rear hydraulic cylinder 33. The two first hydraulic cylinders 31 driving the first directive wheel 10 to deflect in a push-and-pull manner may be understood in that the first rear hydraulic cylinder 33 pulls the first directive wheel 10 when the first front hydraulic cylinder 32 pushes the first directive wheel 10 to deflect, and the first rear hydraulic cylinder 33 pushes the first directive wheel 10 when the first front hydraulic cylinder 32 pulls the first directive wheel 10 to deflect.

A piston rod of each first hydraulic cylinder 31 is connected to the first directive wheel 10, specifically, the piston rod of each first hydraulic cylinder 31 is hinged with the first connecting frame 12 of the first directive wheel 10. Each first hydraulic cylinder 31 includes a first cavity 311 into which liquid is fed to make the piston rod extend out and a second cavity 312 into which liquid is fed to make the piston rod retract. If the first cavity 311 of the first front hydraulic cylinder 32 is fed with liquid, the piston rod of the first front hydraulic cylinder 32 extends out, and the first front hydraulic cylinder 32 pushes the first directive wheel 10 to deflect; if the second cavity 312 of the first front hydraulic cylinder 32 is fed with liquid, the piston rod of the first front hydraulic cylinder 32 retracts, and the first front hydraulic cylinder 32 pulls the first directive wheel 10 to deflect. Likewise, if the first cavity 311 of the first rear hydraulic cylinder 33 is fed with liquid, the piston rod of the first rear hydraulic cylinder 33 extends out, and the first rear hydraulic cylinder 33 pushes the first directive wheel 10 to deflect; and if the second cavity 312 of the first rear hydraulic cylinder 33 is fed with liquid, the piston rod of the first rear hydraulic cylinder 33 retracts, and the first rear hydraulic cylinder 33 pulls the first directive wheel 10 to deflect.

Figure 5:
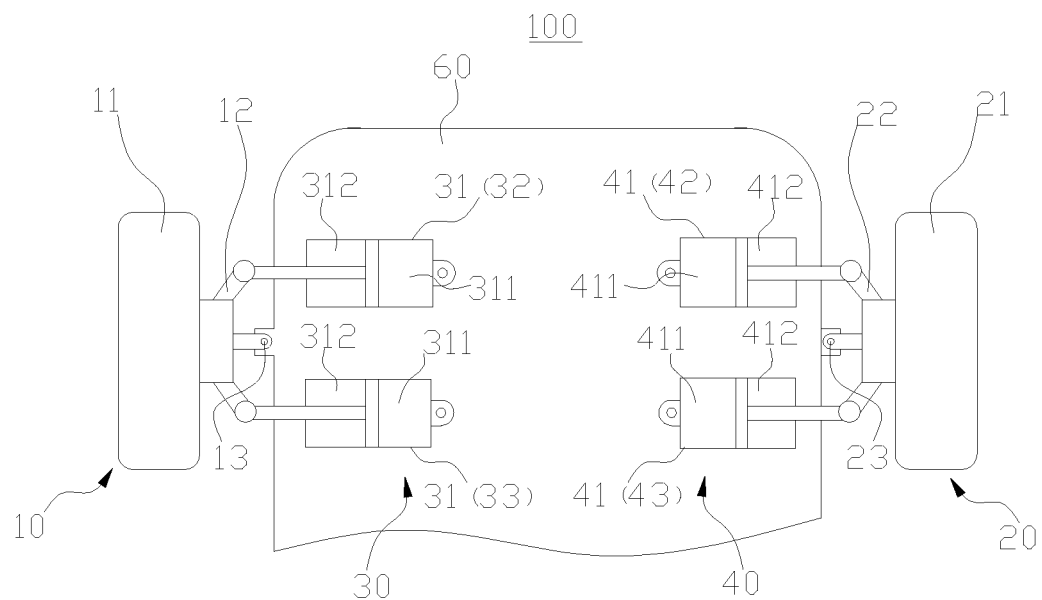
FIG. 5 is a structure diagram of a steering mechanism provided by one other embodiment of the present application.

In the embodiment, cylinder bodies of the two first hydraulic cylinders 31 may be directly fixed to the frame 60, due to the fact that the deflection of the first directive wheel 10 is achieved through the two first hydraulic cylinders 31 in a push-and-pull manner, there may be no need to establish a rotatable connection relationship between the first directive wheel 10 and the frame 60. Certainly, in other embodiments, please refer to FIG. 5, FIG. 5 is a structure diagram of a steering mechanism 100 provided by one other embodiment of the present application, the rotatable connection of the first connecting frame 12 of the first directive wheel 10 and the frame 60 may also be achieved through a first rotating shaft 13, and in the steering process, the first directive wheel 10 is to rotate around the first rotating shaft 13. In this case, the cylinder bodies of the two first hydraulic cylinders 31 may be hinged with the frame 60.

It should be noted that, in other embodiments, other numbers of the first hydraulic cylinders 31 in the first driving device 30 may also be provided, for example, one first hydraulic cylinder 31 may be provided under the condition that the first connecting frame 12 of the first directive wheel 10 is rotationally connected to the frame 60 through the first rotating shaft 13. Certainly, the first driving device 30 may be other structures, for example, the first driving device 30 is an electric machine for driving the first directive wheel 10 to deflect.

In some embodiments, please refer to FIG. 2 to FIG. 4, the second driving device 40 may include two second hydraulic cylinders 41 which are distributed at the same side of the second directive wheel 20 at interval, where one second hydraulic cylinder 41 is configured to push the second directive wheel 20, and another second hydraulic cylinder 41 is configured to pull the second directive wheel 20, thus driving the second directive wheel 20 to deflect.

The second directive wheel 20 is driven to deflect through the two second hydraulic cylinders 41 in a push-and-pull manner, the two second hydraulic cylinders 41 may provide a larger steering force for the second directive wheel 20, and thus the second directive wheel 20 is more stable in the deflection steering process.

Where, for convenience in description, the two second hydraulic cylinders 41 are respectively defined as a second front hydraulic cylinder 42 and a second rear hydraulic cylinder 43. It should be understood that the two second hydraulic cylinders 41 are arranged one behind the other, the second front hydraulic cylinder 42 is located at the front side of the second rear hydraulic cylinder 43. The two second hydraulic cylinders 41 driving the second directive wheel 20 to deflect in a push-and-pull manner may be understood in that the second rear hydraulic cylinder 43 pulls the second directive wheel 20 when the second front hydraulic cylinder 42 pushes the second directive wheel 20 to deflect, and the second rear hydraulic cylinder 43 pushes the second directive wheel 20 when the second front hydraulic cylinder 42 pulls the second directive wheel 20 to deflect.

A piston rod of each second hydraulic cylinder 41 is connected to the second directive wheel 20, specifically, the piston rod of each second hydraulic cylinder 41 is hinged with the second connecting frame 22 of the second directive wheel 20. Each second hydraulic cylinder 41 includes a third cavity 411 into which liquid is fed to make the piston rod extend out and a fourth cavity 412 into which liquid is fed to make the piston rod retract. If the third cavity 411 of the second front hydraulic cylinder 42 is fed with liquid, the piston rod of the second front hydraulic cylinder 42 extends out, and the second front hydraulic cylinder 42 pushes the second directive wheel 20 to deflect; if the fourth cavity 412 of the second front hydraulic cylinder 42 is fed with liquid, the piston rod of the second front hydraulic cylinder 42 retracts, and the second front hydraulic cylinder 42 pulls the second directive wheel 20 to deflect. Likewise, if the third cavity 411 of the second rear hydraulic cylinder 43 is fed with liquid, the piston rod of the second rear hydraulic cylinder 43 extends out, and the second rear hydraulic cylinder 43 pushes the second directive wheel 20 to deflect; if the fourth cavity 412 of the second rear hydraulic cylinder 43 is fed with liquid, the piston rod of the second rear hydraulic cylinder 43 retracts, and the second front hydraulic cylinder 42 pulls the second directive wheel 20 to deflect.

Preferably, the first front hydraulic cylinder 32, the first rear hydraulic cylinder 33, the second front hydraulic cylinder 42 and the second rear hydraulic cylinder 43 are all located between the first directive wheel 10 and the second directive wheel 20, that is, the first front hydraulic cylinder 32 and the first rear hydraulic cylinder 33 are located at the inner side of the first directive wheel 10, and the second front hydraulic cylinder 42 and the second rear hydraulic cylinder 43 are located at the inner side of the second directive wheel 20. Such structure makes the steering mechanism 100 be compact in structure, and the occupied space is reduced.

As shown in FIG. 3, when the first directive wheel 10 and the second directive wheel 20 deflect leftwards in the same direction, the first front hydraulic cylinder 32 is configured to push the first directive wheel 10, the first rear hydraulic cylinder 33 is configured to pull the first directive wheel 10, the second front hydraulic cylinder 42 is configured to pull a second directive wheel 20, and the second rear hydraulic cylinder 43 is configured to push the second directive wheel 20.

As shown in FIG. 4, when the first directive wheel 10 and the second directive wheel 20 deflect rightwards in the same direction, the first front hydraulic cylinder 32 is configured to pull the first directive wheel 10, the first rear hydraulic cylinder 33 is configured to push the first directive wheel 10, the second front hydraulic cylinder 42 is configured to push a second directive wheel 20, and the second rear hydraulic cylinder 43 is configured to pull the second directive wheel 20.

In the embodiment, cylinder bodies of the two second hydraulic cylinders 41 may be directly fixed to the frame 60, due to the fact that the deflection of the second directive wheel 20 is achieved through the two second hydraulic cylinders 41 in a push-and-pull manner, there may be no need to establish a rotatable connection relationship between the second directive wheel 20 and the frame 60. Certainly, in other embodiments, please continue to refer to FIG. 5, the rotatable connection of the second connecting frame 22 of the second directive wheel 20 and the frame 60 may be achieved through a second rotating shaft 23, and in the steering process, the second directive wheel 20 is to rotate around the second rotating shaft 23. In this case, the cylinder bodies of the two second hydraulic cylinders 41 may be hinged with the frame 60.

It should be noted that, in still another embodiment, other numbers of the second hydraulic cylinders 41 in the second driving device 40 may also be provided, for example, one second hydraulic cylinder 41 may be provided under the condition that the second connecting frame 22 of the second directive wheel 20 is rotationally connected to the frame 60 through the second rotating shaft 23. Certainly, the second driving device 40 may also be other structures, for example, the second driving device 40 is an electric machine for driving the second directive wheel 20 to deflect.

Figure 6:
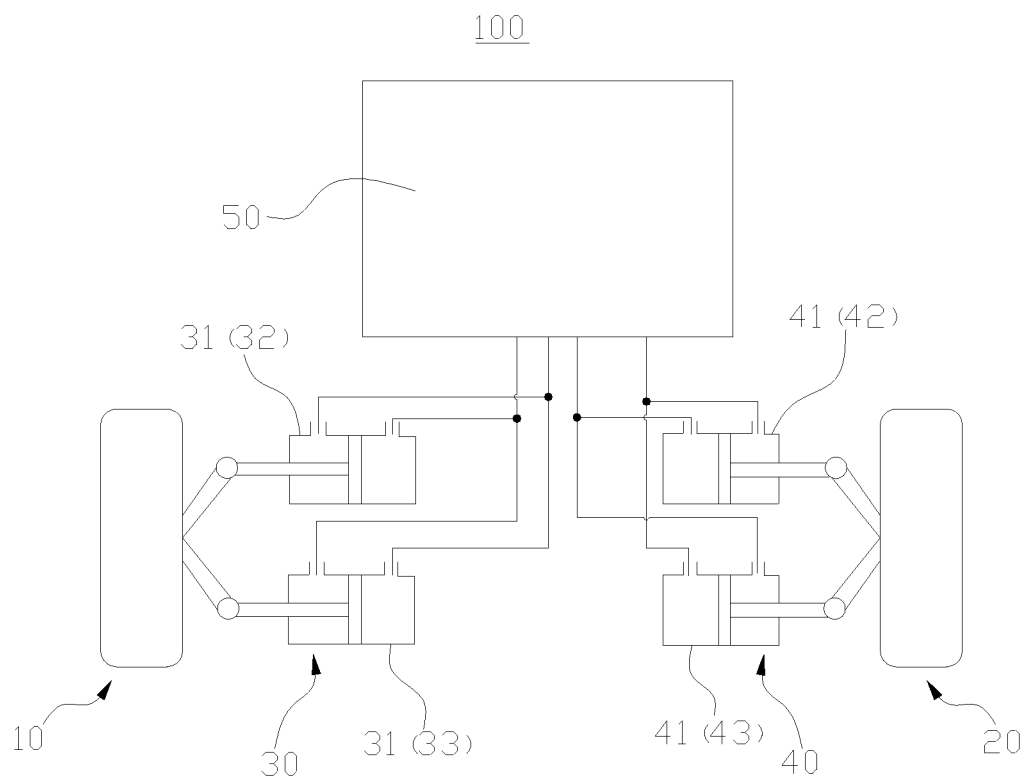
FIG. 6 is a structure diagram of a steering mechanism provided by some further embodiments of the present application.

In some embodiments, please refer to FIG. 6, FIG. 6 is a structure diagram of a steering mechanism 100 provided by some further embodiments of the present application. The steering mechanism 100 may further include a hydraulic control system 50, the hydraulic control system 50 is configured to supply liquid to the first driving device 30 and the second driving device 40, thus making the first driving device 30 and the second driving device 40 separately drive the first directive wheel 10 and the second directive wheel 20 respectively, and thus making the first directive wheel 10 and the second directive wheel 20 deflect in the same direction to achieve steering.

It should be understood that the first driving device 30 and the second driving device 40 are hydraulic execution devices, and the first driving device 30 and the second driving device 40 may provide a large driving force for the first directive wheel 10 and the second directive wheel 20 under the action of the hydraulic control system 50. In various embodiments, the first front hydraulic cylinder 32, the first rear hydraulic cylinder 33, the second front hydraulic cylinder 42 and the second rear hydraulic cylinder 43 are all hydraulic execution devices. As an example, the hydraulic control system 50 supplies liquid to the first front hydraulic cylinder 32, the first rear hydraulic cylinder 33, the second front hydraulic cylinder 42, and the second rear hydraulic cylinder 43, a specific structure of the hydraulic control system 50 is set forth in detail below.

Figure 7:
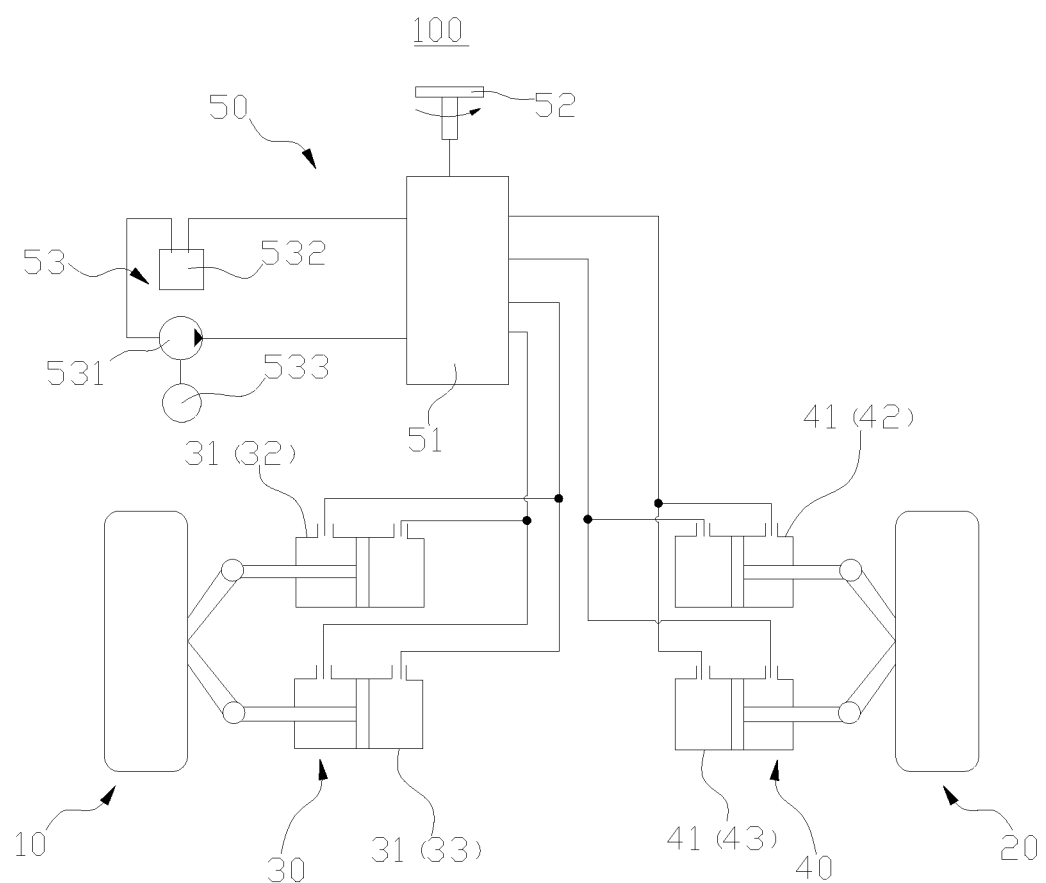
FIG. 7 is a structure diagram of a steering mechanism (in which a first directive wheel and a second directive wheel are undeflected) provided by yet further embodiments of the present application.
Figure 8:
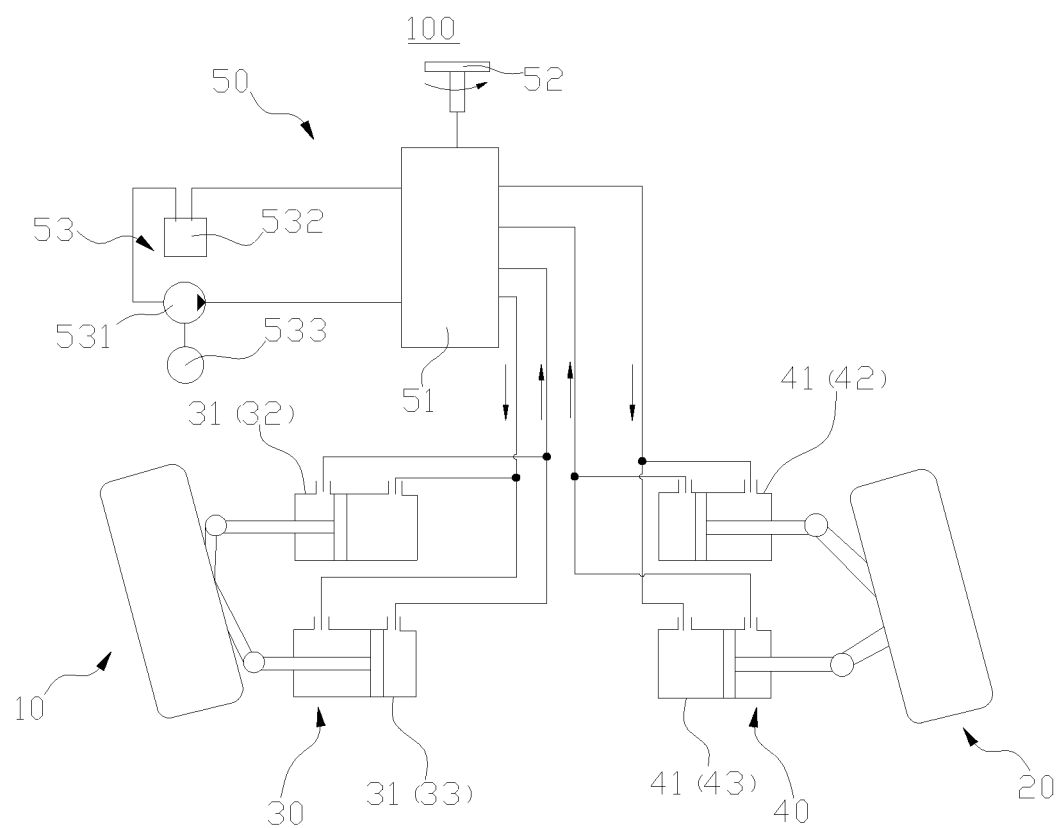
FIG. 8 is a structure diagram of a steering mechanism (in which a first directive wheel and a second directive wheel are deflected leftwards) provided by yet further embodiments of the present application.
Figure 9:
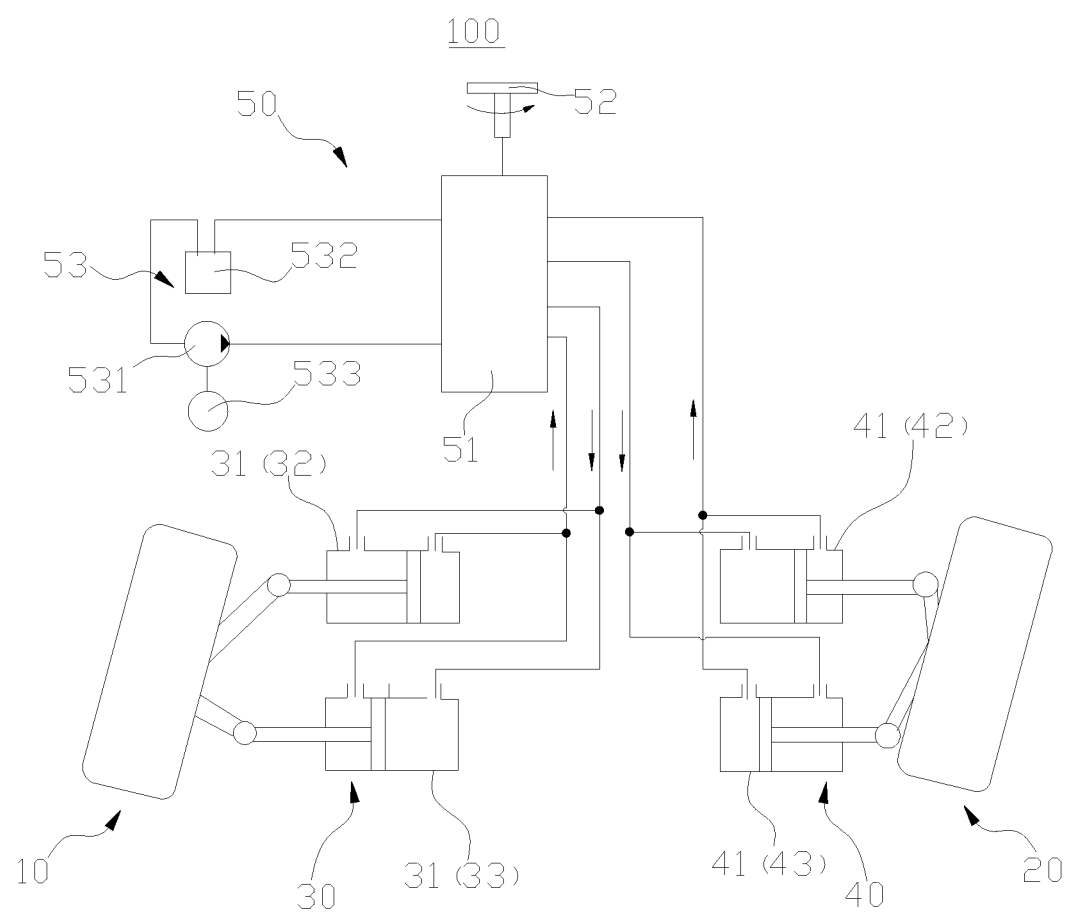
FIG. 9 is a structure diagram of a steering mechanism (in which a first directive wheel and a second directive wheel are deflected rightwards) provided by yet further embodiments of the present application.

In some embodiments, please refer to FIG. 7 to FIG. 9, FIG. 7 is a structure diagram of a steering mechanism 100 (in which a first directive wheel 10 and a second directive wheel 20 are undeflected) provided by yet further some embodiments of the present application, FIG. 8 is a structure diagram of a steering mechanism 100 (in which a first directive wheel 10 and a second directive wheel 20 are deflected leftwards) provided by yet further embodiments of the present application, and FIG. 9 is a structure diagram of a steering mechanism 100 (in which a first directive wheel 10 and a second directive wheel 20 are deflected rightwards)

provided by yet further embodiments of the present application. The hydraulic control system 50 may include a steering control device 51, a steering part 52, and a liquid supply device 53.

The steering control device 51 has a first working state and a second working state. The steering part 52 is in transmission connection with the steering control device 51, and the steering part 52 is configured to control the steering control device 51 to switch between the first working state and the second working state.

As shown in FIG. 8, the liquid supply device 53 is configured to supply liquid to the first driving device 30 and the second driving device 40 when the steering control device 51 is in the first working state, thus making the first driving device 30 and the second driving device 40 respectively drive the first directive wheel 10 and the second directive wheel 20 to deflect leftwards in the same direction.

As shown in FIG. 9, the liquid supply device 53 is also configured to supply liquid to the first driving device 30 and the second driving device 40 when the steering control device 51 is in the second working state, thus making the first driving device 30 and the second driving device 40 respectively drive the first directive wheel 10 and the second directive wheel 20 to deflect rightwards in the same direction.

The steering control device 51 may be controlled by the steering part 52 to make the steering control device 51 be in the first working state or the second working state and make the liquid supply device 53 supply liquid for the first driving device 30 and the second driving device 40, and thus the same-direction leftwards deflection and same-direction rightwards deflection of the first directive wheel 10 and the second directive wheel 20 is achieved. The hydraulic control system 50 with such structure may achieve steering by operating the steering part 52, the overall structure is simple, and the steering operation is convenient.

The liquid supply device 53 may include a hydraulic pump 531 and a liquid storage tank 532, the hydraulic pump 531 is configured to pump liquid from the liquid storage tank 532 into the steering control device 51. The hydraulic pump 531 may be driven by a driving motor 533. The liquid in the liquid storage tank 532 may be oil.

The steering part 52 may be a steering wheel, and the switching of the steering control device 51 between the first working state and the second working state may be achieved by rotating the directive wheel.

The steering control device 51 may have a variety of structures as long as it is possible to achieve steering of the first directive wheel 10 and the second directive wheel 20 by switching liquid paths.

Figure 10:
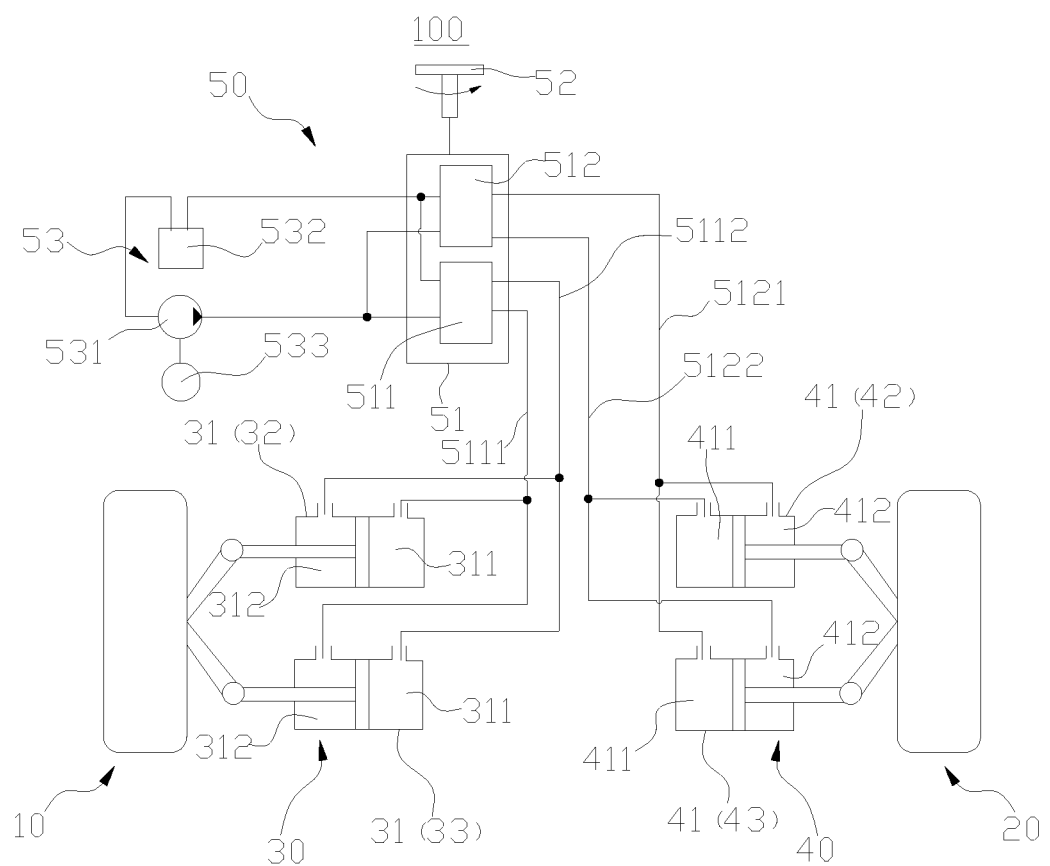
FIG. 10 is a structure diagram of a steering mechanism (in which a first directive wheel and a second directive wheel are undeflected) provided by some other embodiments of the present application.
Figure 11:
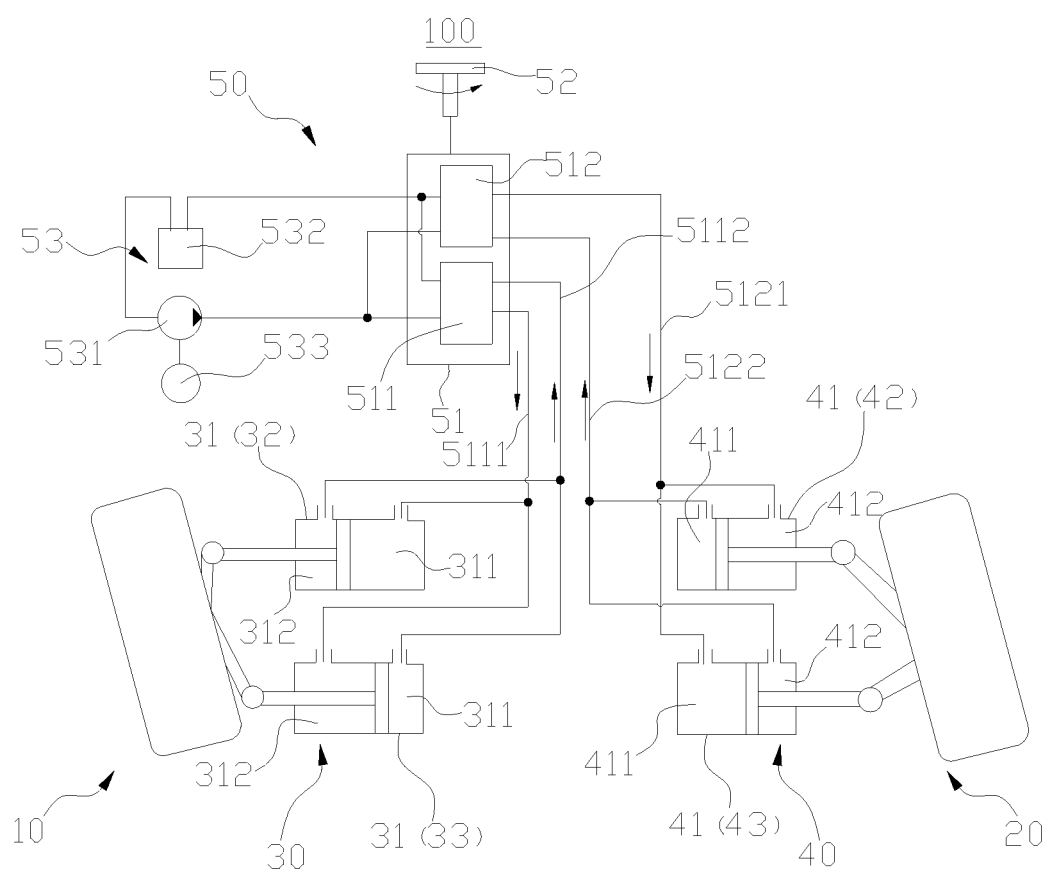
FIG. 11 is a structure diagram of a steering mechanism (in which a first directive wheel and a second directive wheel are deflected leftwards) provided by some other embodiments of the present application.
Figure 12:
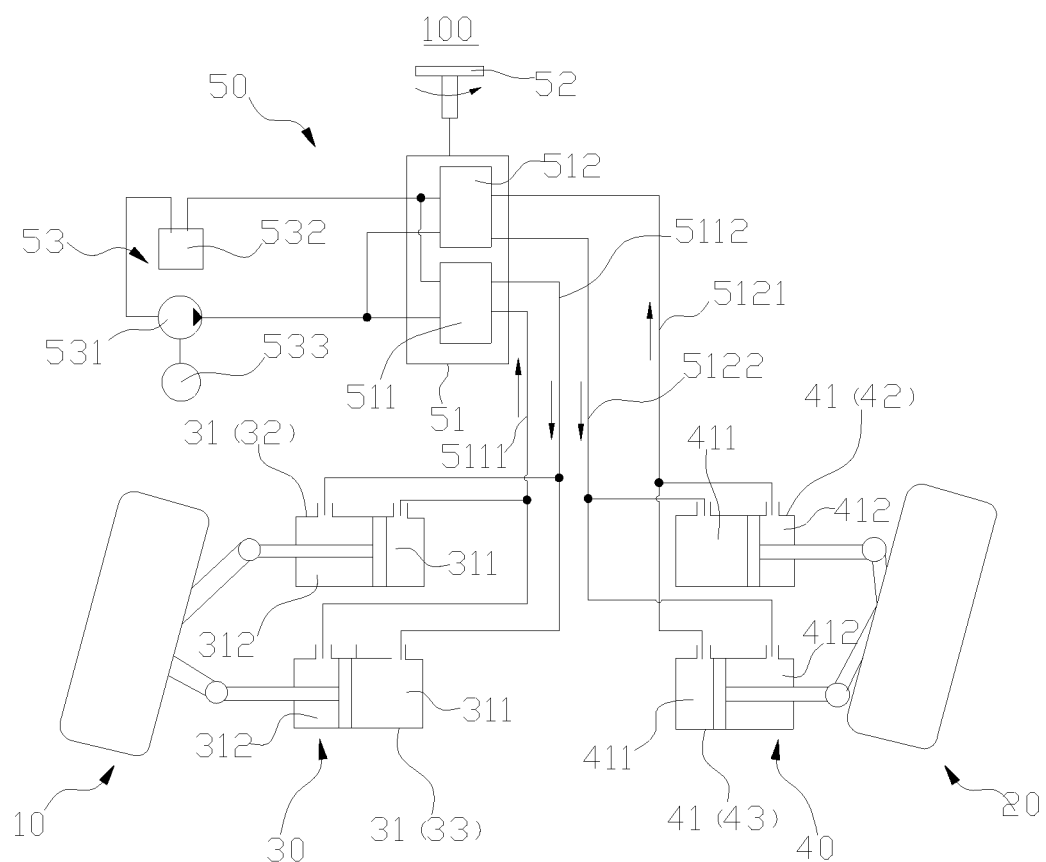
FIG. 12 is a structure diagram of a steering mechanism (in which a first directive wheel and a second directive wheel are deflected rightwards) provided by some other embodiments of the present application.

In some embodiments, please refer to FIG. 10 to FIG. 12, FIG. 10 is a structure diagram of a steering mechanism 100 (in which a first directive wheel 10 and a second directive wheel 20 are undeflected) provided by some other embodiments of the present application, FIG. 11 is a structure diagram of a steering mechanism 100 (in which a first directive wheel 10 and a second directive wheel 20 are deflected leftwards) provided by some other embodiments of the present application, and FIG. 12 is a structure diagram of a steering mechanism 100 (in which a first directive wheel 10 and a second directive wheel 20 are deflected rightwards) provided by some other embodiments of the present application. The steering control device 51 may include a first reversing valve 511 and a second reversing valve 512, where the first reversing valve 511 is connected to the first driving device 30 through a first pipeline 5111 and a second pipeline 5112; and the second reversing valve 512 is connected to the second driving device 40 through a third pipeline 5121 and a fourth pipeline 5122.

The steering part 52 is configured to switch positions of a valve core of the first reversing valve 511 and a valve core of the second reversing valve 512, thus making the steering control device 51 be in the first working state or the second working state.

As shown in FIG. 11, when the steering control device 51 is in the first working state, the first pipeline 5111 and the third pipeline 5121 are liquid inlet pipelines, and the second pipeline 5112 and the fourth pipeline 5122 are liquid return pipelines; as shown in FIG. 12, when the steering control device 51 is in the second working state, the first pipeline 5111 and the third pipeline 5121 are liquid return pipelines, and the second pipeline 5112 and the fourth pipeline 5122 are liquid inlet pipelines.

Where the steering part 52 may be in transmission connection with the valve core of the first reversing valve 511 and the valve core of the second reversing valve 512 through a transmission mechanism to transfer a rotating force of the steering part 52 to the valve core of the first reversing valve 511 and the valve core of the second reversing valve 512, thus making the valve core of the first reversing valve 511 and the valve core of the second reversing valve 512 move to change the working states of the first reversing valve 511 and the second reversing valve 512. The transmission mechanism may have a variety of structural forms, such as, a pinion and rack mechanism.

Optionally, a first cavity 311 of the first front hydraulic cylinder 32 and a second cavity 312 of the first rear hydraulic cylinder 33 are all communicated with the first pipeline 5111, and the second cavity 312 of the first front hydraulic cylinder 32 and the first cavity 311 of the first rear hydraulic cylinder 33 are all communicated with the second pipeline 5112. A third cavity 411 of the second front hydraulic cylinder 42 and a fourth cavity 412 of the second rear hydraulic cylinder 43 are all communicated with the fourth pipeline 5122, and the fourth cavity 412 of the second front hydraulic cylinder 42 and the third cavity 411 of the second rear hydraulic cylinder 43 are all communicated with the third pipeline 5121.

As shown in FIG. 11, when the steering control device 51 is in the first working state, due to the fact that the first pipeline 5111 and the third pipeline 5121 are liquid inlet pipelines, and the second pipeline 5112 and the fourth pipeline 5122 are liquid return pipelines, the first cavity 311 of the first front hydraulic cylinder 32 and the second cavity 312 of the first rear hydraulic cylinder 33 are fed with liquid through the first pipeline 5111, the fourth cavity 412 of the second front hydraulic cylinder 42 and the third cavity 411 of the second rear hydraulic cylinder 43 are fed with liquid through the third pipeline 5121, the liquid in the second cavity 312 of the first front hydraulic cylinder 32 and the liquid in the first cavity 311 of the first rear hydraulic cylinder 33 flow back through the second pipeline 5112 and finally flow back into the liquid storage tank 532, and the liquid in the third cavity 411 of the second front hydraulic cylinder 42 and the liquid in the fourth cavity 412 of the second rear hydraulic cylinder 43 flow back through the second pipeline 5112 and finally flow back into the liquid storage tank 532. During this process, the piston rod of the first front hydraulic cylinder 32 extends out to apply thrust to the first directive wheel 10; the piston rod of the first rear hydraulic cylinder 33 retracts to apply tensile force to the first directive wheel 10; the piston rod of the second front hydraulic cylinder 42 retracts to apply tensile force to the second directive wheel 20; and the piston rod of the second rear hydraulic cylinder 43 extends out to apply thrust to the second directive wheel 20. The same-direction leftward deflection of the first directive wheel 10 and the second directive wheel 20 is ultimately achieved.

As shown in FIG. 12, when the steering control device 51 is in the second working state, due to the fact that the first pipeline 5111 and the third pipeline 5121 are liquid return pipelines, and the second pipeline 5112 and the fourth pipeline 5122 are liquid inlet pipelines, the second cavity 312 of the first front hydraulic cylinder 32 and the first cavity 311 of the first rear hydraulic cylinder 33 are fed with liquid through the second pipeline 5112; the third cavity 411 of the second front hydraulic cylinder 42 and the fourth cavity 412 of the second rear hydraulic cylinder 43 are fed with liquid through a fourth pipeline 5122, the liquid in the first cavity 311 of the first front hydraulic cylinder 32 and the liquid in the second cavity 312 of the first rear hydraulic cylinder 33 flow back through the first pipeline 5111 and finally flow back into the liquid storage tank 532, and the liquid in the fourth cavity 412 of the second front hydraulic cylinder 42 and the liquid in the third cavity 411 of the second rear hydraulic cylinder 43 flow back through the fourth pipeline 5122 and finally flow back into the liquid storage tank 532. During this process, the piston rod of the first rear hydraulic cylinder 33 extends out to apply thrust to the first directive wheel 10; the piston rod of the first front hydraulic cylinder 32 retracts to apply tensile force to the first directive wheel 10; the piston rod of the second rear hydraulic cylinder 43 retracts to apply tensile force to the second directive wheel 20; and the piston rod of the second front hydraulic cylinder 42 extends out to apply thrust to the second directive wheel 20. The same-direction rightward deflection of the first directive wheel 10 and the second directive wheel 20 is ultimately achieved.

The first reversing valve 511 and the second reversing valve 512 may be three-position four-way directional control valves, the valve core of the first reversing valve 511 is provided with three positions: a left position, a right position, and a middle position. When the valve core of the first reversing valve 511 and the valve core of the second reversing valve 512 are both located at the left position, the steering control device 51 is in the first working state, the first pipeline 5111 supplies liquid to the first front hydraulic cylinder 32 and the first rear hydraulic cylinder 33, the third pipeline 5121 supplies liquid to the second front hydraulic cylinder 42 and the second rear hydraulic cylinder 43, and the first directive wheel 10 and the second directive wheel 20 deflect leftwards; when the valve core of the first reversing valve 511 and the valve core of the second reversing valve 512 are both located at the right position, the steering control device 51 is in the second working state, the second pipeline 5112 supplies liquid to the first front hydraulic cylinder 32 and the first rear hydraulic cylinder 33, the fourth pipeline 5122 supplies liquid to the second front hydraulic cylinder 42 and the second rear hydraulic cylinder 43, and the first directive wheel 10 and the second directive wheel 20 deflect rightwards. When the valve core of the first reversing valve 511 and the valve core of the second reversing valve 512 are both located at the middle position, none of the first pipeline 5111, the second pipeline 5112, the third pipeline 5121 and the fourth pipeline 5122 supplies the liquid, and thus none of the first directive wheel 10 and the second directive wheel 20 deflects.

In other embodiments, the steering control device 51 may also be other structural valves, for example, the steering control device 51 is a rotary-actuated proportional valve, i.e., a proportional valve that is switched by rotation of the steering part 52.

Figure 13:
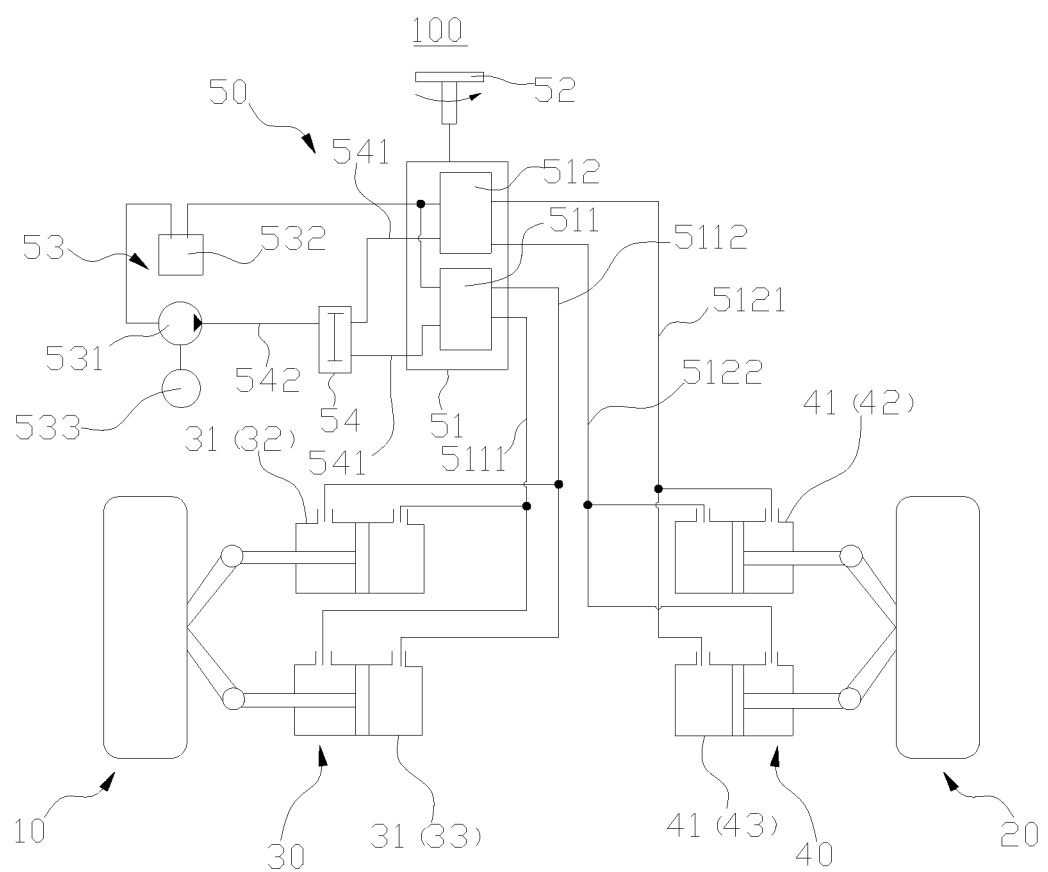
FIG. 13 is a structure diagram of a steering mechanism provided by some embodiments of the present application.

In some embodiments, please refer to FIG. 13, FIG. 13 is a structure diagram of a steering mechanism 100 provided by some embodiments of the present application. The hydraulic control system 50 further includes a flow divider valve 54, where liquid supplied by the liquid supply device 53 flows into the first driving device 30 and the second driving device 40 through the flow divider valve 54 and the steering control device 51 in sequence; the flow divider valve 54 is configured to regulate the proportion of the flow of liquid flowing into the first driving device 30 from the steering control device 51 to the flow of liquid flowing into the second driving device 40 from the steering control device 51, thus making the deflection angle of the first directive wheel 10 and the deflection angle of the second directive wheel 20 be the same or different.

During actual traveling process, the proportion of the flow of the liquid flowing into the first driving device 30 to the flow of the liquid flowing into the second driving device 40 may be controlled through the flow divider valve 54 according to a specific driving condition to make the deflection angles of the first directive wheel 10 and the second directive wheel 20 in the steering process be same or different, and the control performance and the driving feeling are improved.

The flow divider valve 54 may regulate the proportion of the flow of liquid flowing into the first driving device 30 from the steering control device 51 to the flow of liquid flowing into the second driving device 40 from the steering control device 51 during turning according to different vehicle speeds and a rotation direction of the steering part 52. For example, when the vehicle speed is not more than a first preset value, the flow divider valve 54 controls the flow of liquid flowing into the first driving device 30 to be equal to the flow of liquid flowing into the second driving device 40 no matter the steering part 52 rotates forwards or reversely, thus making the deflection angles of the first directive wheel 10 and the second directive wheel 20 be equal; when the vehicle speed is more than the first preset value, the steering part 52 rotates forwards, the first directive wheel 10 located at the left side and the second directive wheel 20 located at the right side deflect leftwards, and the flow divider valve 54 controls the flow of liquid flowing into the first driving device 30 to be less than the flow of liquid flowing into the second driving device 40, thus making the leftward deflection angle of the first directive wheel 10 be less than leftward deflection angle of the second directive wheel 20; when the vehicle speed is more than the first preset value, when the steering part 52 rotates reversely, the first directive wheel 10 located at the left side and the second directive wheel 20 located at the right side deflect rightwards, and the flow divider valve 54 controls the flow of liquid flowing into the second driving device 40 to be less than the flow of liquid flowing into the first driving device 30, thus making the rightward deflection angle of the second directive wheel 20 be less than rightward deflection angle of the first directive wheel 10.

The flow divider valve 54 is provided with a liquid inlet, a first liquid outlet, and a second liquid outlet, the first liquid outlet and the second liquid outlet are communicated with the first reversing valve 511 and the second reversing valve 512 through a pipe 541 respectively, and the liquid inlet is communicated with the hydraulic pump 531 through a connecting pipe 542. The flow divider valve 54 controls the proportion of the flow of the liquid flowing into the first driving device 30 to the flow of the liquid flowing into the second driving device 40 from the steering control device 51, that is, controlling the proportion of the flow of the liquid discharged from the first liquid outlet to the flow of the liquid discharged from the second liquid outlet.

Figure 14:
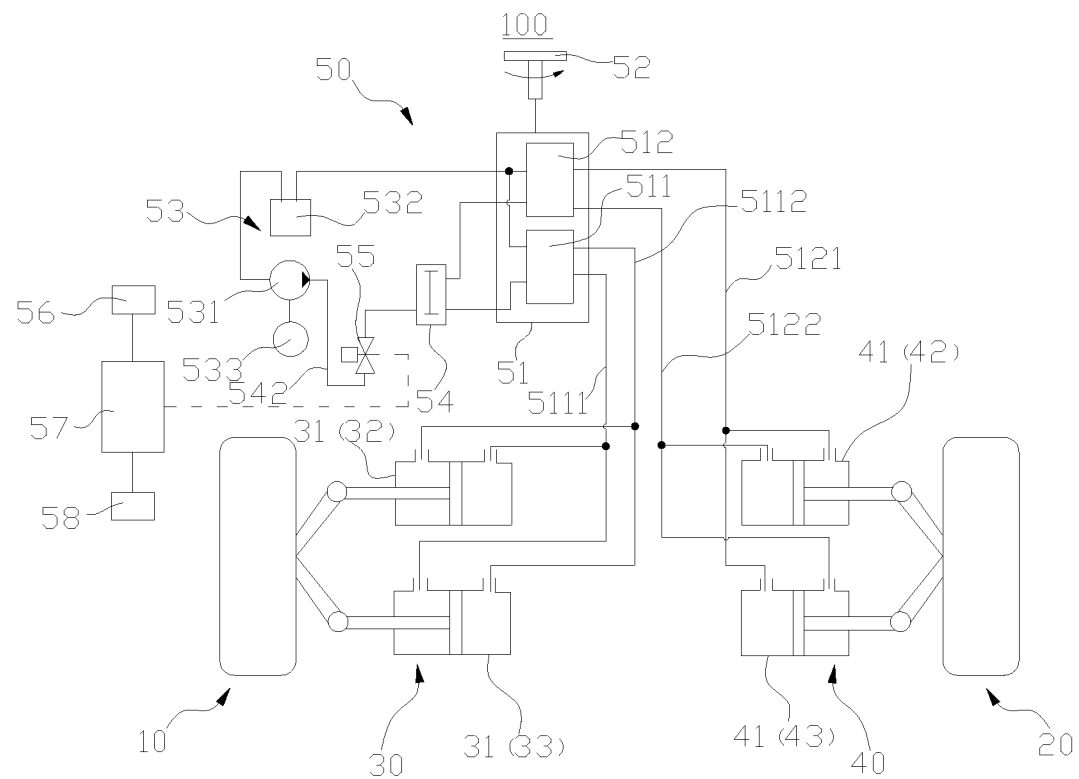
FIG. 14 is a structure diagram of a steering mechanism provided by yet further embodiments of the present application.

In some embodiments, please refer to FIG. 14, FIG. 14 is a structure diagram of a steering mechanism 100 provided by yet further embodiments of the present application. The hydraulic control system 50 further includes a flow regulating valve 55, a vehicle speed sensor 56, and a control unit 57.

The liquid supplied by the liquid supply device 53 flows into the first driving device 30 and the second driving device 40 through the flow regulating valve 55, the flow divider valve 54, and the steering control device 51 in sequence. The vehicle speed sensor 56 is configured to acquire a vehicle speed signal of the vehicle 1000. The control unit 57 is configured to control the flow regulating valve 55 to regulate the flow of the liquid flowing into the flow divider valve 54 according to the vehicle speed signal.

The vehicle speed signal of the vehicle 1000 may be acquired through the vehicle speed sensor 56, and the flow regulating valve 55 may be controlled according to the vehicle speed signal control unit 57 to regulate the flow of the liquid flowing into the flow divider valve 54. If the flow of the liquid flowing into the flow divider valve 54 is changed, the flow of the liquid flowing into the first driving device 30 and the second driving device 40 through the flow divider valve 54 and the steering control device 51 in sequence is also changed, thus changing the driving force provided for the first directive wheel 10 and the second directive wheel 20 by the first driving device 30 and the second driving device 40 respectively.

When the vehicle speed is relatively low (the vehicle speed is not more than a second preset value, for example, the vehicle speed is not more than 30 Km/h), the vehicle speed sensor 56 acquires a vehicle speed signal representing the low vehicle speed, and if a driver turns through the steering part 52, the flow regulating valve 55 is controlled through the control unit 57 to increase the flow of liquid flowing into the flow divider valve 54, and the first driving device 30 and the second driving device 40 are ultimately configured to respectively provide a larger driving force for the first directive wheel 10 and the second directive wheel 20, thus making the first directive wheel 10 and the second directive wheel 20 deflect at a relatively high speed.

When the vehicle speed is relatively high (the vehicle speed is more than a second preset value, for example, the vehicle speed is more than 30 Km/h), the vehicle speed sensor 56 acquires a vehicle speed signal representing the high vehicle speed, and if a driver turns through the steering part 52, the flow regulating valve 55 is controlled through the control unit 57 to reduce the flow of liquid flowing into the flow divider valve 54, and the first driving device 30 and the second driving device 40 are ultimately configured to respectively provide a lesser driving force for the first directive wheel 10 and the second directive wheel 20, thus making the first directive wheel 10 and the second directive wheel 20 deflect at a relatively slow speed, and the safety during high-speed traveling is improved.

The flow regulating valve 55 is arranged on the connecting pipe 542 connected between the hydraulic pump 531 and the liquid inlet of the flow divider valve 54. The flow regulating valve 55 may be an electromagnetic flow regulating valve 55.

The vehicle speed sensor 56 and the flow regulating valve 55 are all electrically connected to the control unit 57, and the control unit 57 may be an ECU (Electronic Control Unit) of the vehicle 1000.

In some embodiments, please continue to refer to FIG. 14, the hydraulic control system 50 further includes a torque sensor 58 which is configured to acquire a torque signal of the steering part 52. The control unit 57 is also configured to control the flow regulating valve 55 to regulate the flow of the liquid flowing into the flow divider valve 54 according to the torque signal.

Where the torque sensor 58 is electrically connected to the control unit 57.

The torque signal of the steering part 52 may be acquired through the torque sensor 58, and the flow regulating valve 55 may be controlled according to the torque signal control unit 57 to regulate the flow of the liquid flowing into the flow divider valve 54. If the flow of the liquid flowing into the flow divider valve 54 is changed, the flow of the liquid flowing into the first driving device 30 and the second driving device 40 through the flow divider valve 54 and the steering control device 51 in sequence is also changed, thus changing the driving force provided for the first directive wheel 10 and the second directive wheel 20 by the first driving device 30 and the second driving device 40 respectively.

When the torque applied to the steering part 52 by a driver in the steering process of the steering part 52 is more than a preset value, the torque sensor 58 may acquire a torque signal representing the magnitude of the torque applied to the steering part 52, and the flow regulating valve 55 is controlled through the control unit 57 to increase the flow of liquid flowing into the flow divider valve 54, and the first driving device 30 and the second driving device 40 are ultimately configured to respectively provide a larger driving force for the first directive wheel 10 and the second directive wheel 20, thus making the first directive wheel 10 and the second directive wheel 20 deflect at a relatively high speed; when the torque applied to the steering part 52 by a driver in the steering process of the steering part 52 is less than the preset value, the torque sensor 58 may acquire a torque signal representing the magnitude of the torque applied to the steering part 52, and the flow regulating valve 55 is controlled through the control unit 57 to reduce the flow of liquid flowing into the flow divider valve 54, and the first driving device 30 and the second driving device 40 are ultimately configured to respectively provide a lesser driving force for the first directive wheel 10 and the second directive wheel 20, thus making the first directive wheel 10 and the second directive wheel 20 deflect at a relatively slow speed.

Figure 15:
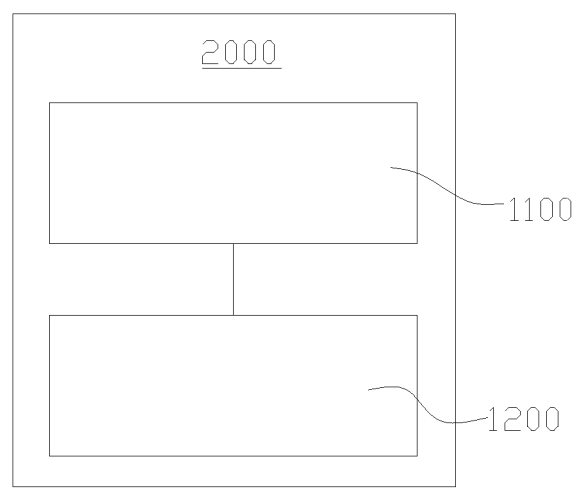
FIG. 15 is a schematic block diagram of an apparatus for producing a steering mechanism provided by some embodiments of the present application.

Please refer to FIG. 15, FIG. 15 is a schematic block diagram of an apparatus 2000 for producing a steering mechanism provided by some embodiments of the present application. The apparatus 2000 for producing a steering mechanism includes a providing device 1100 and an installing device 1200.

Where the providing device 1100 is configured to provide a first directive wheel 10, a second directive wheel 20, a first driving device 30, and a second driving device 40.

The installing device 1200 is configured to respectively install the first directive wheel 10 and the second directive wheel 20 on the first driving device 30 and the second driving device 40.

Where the first driving device 30 and the second driving device 40 are configured to separately drive the first directive wheel 10 and the second directive wheel 20 respectively, thus making the first directive wheel 10 and the second directive wheel 20 deflect in the same direction to achieve steering.

Figure 16:
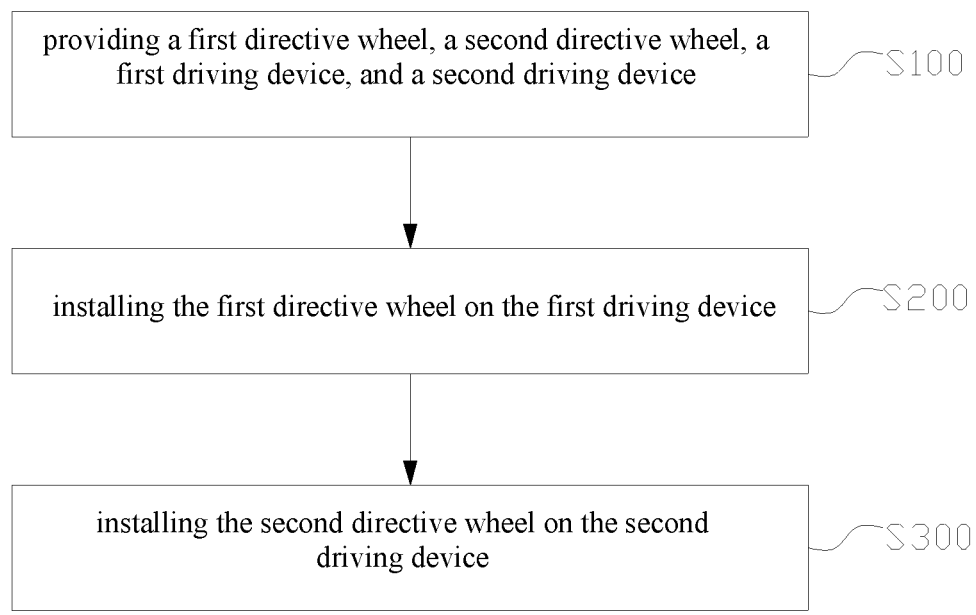
FIG. 16 is a flow diagram of a method for producing a steering mechanism provided by some embodiments of the present application.

Please refer to FIG. 16, FIG. 16 is a flow diagram of a method for producing a steering mechanism 100 provided by some embodiments of the present application. The method for producing a steering mechanism 100 includes:

S100: providing a first directive wheel 10, a second directive wheel 20, a first driving device 30, and a second driving device 40.

S200: installing the first directive wheel 10 on the first driving device 30;

and S300: installing the second directive wheel 20 on the second driving device 40.

Where the first driving device 30 and the second driving device 40 are configured to separately drive the first directive wheel 10 and the second directive wheel 20 respectively, thus making the first directive wheel 10 and the second directive wheel 20 deflect in the same direction to achieve steering.

It should be noted that step S200 may be performed before step S300 or may be performed after step S300.

It should be noted that the embodiments and the features in the embodiments in the present application may be combined with each other without conflict.

While the present application has been described with reference to preferred embodiments, various modifications may be made thereto and equivalents may be substituted for components thereof without departing from the scope of the present application. In particular, various technical features mentioned in the various embodiments may be combined in any way, as long as there is no structural conflict. The present application is not limited to the particular embodiments disclosed herein, but includes all technical solutions falling within the scope of the claims.

What is claimed is:

1. A steering mechanism, comprising:
    a first directive wheel;
    a second directive wheel;
    a first driving device connected to the first directive wheel; and
    a second driving device connected to the second directive wheel;
    wherein the first driving device and the second driving device are configured to separately drive the first directive wheel and the second directive wheel respectively, thus making the first directive wheel and the second directive wheel deflect in a same direction as each other to achieve steering;
    a hydraulic control system configured to supply liquid to the first driving device and the second driving device, thus making the first driving device and the second driving device separately drive the first directive wheel and the second directive wheel respectively, and making the first directive wheel and the second directive wheel deflect in the same direction;
    a steering control device having a first working state and a second working state;
    a steering part in transmission connection with the steering control device, wherein the steering part is configured to control the steering control device to switch between the first working state and the second working state; and
    a liquid supply device, the liquid supply device being configured to supply liquid to the first driving device and the second driving device when the steering control device is in the first working state, thus making the first driving device and the second driving device respectively drive the first directive wheel and the second directive wheel to deflect leftwards in the same direction, and being also configured to supply the liquid to the first driving device and the second driving device when the steering control device is in the second working state, thus making the first driving device and the second driving device respectively drive the first directive wheel and the second directive wheel to deflect rightwards in the same direction;
    a flow divider valve, wherein the liquid supplied by the liquid supply device flows into the first driving device and the second driving device through the flow divider valve and the steering control device in sequence; the flow divider valve is configured to regulate a proportion of flow of the liquid flowing into the first driving device from the steering control device to flow of the liquid flowing into the second driving device from the steering control device, thus making a deflection angle of the first directive wheel and a deflection angle of the second directive wheel be the same or different;
    wherein the hydraulic control system further comprises:
        a flow regulating valve, wherein the liquid supplied by the liquid supply device flows into the first driving device and the second driving device through the flow regulating valve, the flow divider valve, and the steering control device in sequence;
        a vehicle speed sensor for acquiring a vehicle speed signal of a vehicle; and
        a control unit configured to control the flow regulating valve to regulate the flow of the liquid flowing into the flow divider valve according to the vehicle speed signal.

2. The steering mechanism according to claim 1, wherein the first driving device comprises:
    two first hydraulic cylinders distributed at a same side of the first directive wheel at an interval, wherein one of the two first hydraulic cylinders is configured to push the first directive wheel, and another first hydraulic cylinder of the two first hydraulic cylinders is configured to pull the first directive wheel, thus driving the first directive wheel to deflect.

3. The steering mechanism according to claim 2, wherein the second driving device comprises:
    two second hydraulic cylinders distributed at a same side of the second directive wheel at an interval, wherein one of the two second hydraulic cylinders is configured to push the second directive wheel, and another second hydraulic cylinder of the two second hydraulic cylinders is configured to pull the second directive wheel, thus driving the second directive wheel to deflect.

4. The steering mechanism according to claim 3, wherein the two first hydraulic cylinders comprise a first front hydraulic cylinder and a first rear hydraulic cylinder, the two second hydraulic cylinders comprise a second front hydraulic cylinder and a second rear hydraulic cylinder, and the first front hydraulic cylinder, the first rear hydraulic cylinder, the second front hydraulic cylinder, and the second rear hydraulic cylinder are all located between the first directive wheel and the second directive wheel;
    when the first directive wheel and the second directive wheel deflect leftwards in the same direction, the first front hydraulic cylinder is configured to push the first directive wheel, the first rear hydraulic cylinder is configured to pull the first directive wheel, the second front hydraulic cylinder is configured to pull the second directive wheel, and the second rear hydraulic cylinder is configured to push the second directive wheel;

and when the first directive wheel and the second directive wheel deflect rightwards in the same direction, the first front hydraulic cylinder is configured to pull the first directive wheel, the first rear hydraulic cylinder is configured to push the first directive wheel, the second front hydraulic cylinder is configured to push the second directive wheel, and the second rear hydraulic cylinder is configured to pull the second directive wheel.

5. The steering mechanism according to claim 1, wherein the hydraulic control system further comprises:
a torque sensor configured to acquire a torque signal of the steering part;
and the control unit is also configured to control the flow regulating valve to regulate the flow of the liquid flowing into the flow divider valve according to the torque signal.

6. The steering mechanism according to claim 1, wherein the steering control device comprises:
a first reversing valve connected to the first driving device through a first pipeline and a second pipeline; and
a second reversing valve communicated with the second driving device through a third pipeline and a fourth pipeline;
wherein the steering part is configured to switch positions of a valve core of the first reversing valve and a valve core of the second reversing valve, thus making the steering control device be in a first working state or a second working state;
when the steering control device is in the first working state, the first pipeline and the third pipeline are liquid inlet pipelines, and the second pipeline and the fourth pipeline are liquid return pipelines;
and when the steering control device is in the second working state, the first pipeline and the third pipeline are liquid return pipelines, and the second pipeline and the fourth pipeline are liquid inlet pipelines.

7. The steering mechanism according to claim 6, wherein the first driving device comprises:
two first hydraulic cylinders distributed at a same side of the first directive wheel at an interval, wherein a piston rod of each of the two first hydraulic cylinders is connected to the first directive wheel, each of the two first hydraulic cylinders comprises a first cavity into which the liquid is fed to make the piston rod extend out and a second cavity into which the liquid is fed to make the piston rod retract;
wherein the first cavity of one of the two first hydraulic cylinders and the second cavity of another first hydraulic cylinder are communicated with the first pipeline, and the second cavity of the another first hydraulic cylinder of the two first hydraulic cylinders and the first cavity of another first hydraulic cylinder of the two first hydraulic cylinders are communicated with the second pipeline.

8. The steering mechanism according to claim 7, wherein the second driving device comprises:
two second hydraulic cylinders distributed at a same side of the second directive wheel at an interval, wherein a piston rod of each of the two second hydraulic cylinders is connected to the second directive wheel, each of the two second hydraulic cylinders comprises a third cavity into which the liquid is fed to make the piston rod extend out and a fourth cavity into which the liquid is fed to make the piston rod retract;
wherein the third cavity of one of the two second hydraulic cylinders and the fourth cavity of another second hydraulic cylinder of the two second hydraulic cylinders are communicated with the third pipeline, and the fourth cavity of the one of the two second hydraulic cylinders and the third cavity of another second hydraulic cylinder of the two second hydraulic cylinders are communicated with the fourth pipeline.

9. A vehicle, comprising the steering mechanism according to claim 1.

10. A steering mechanism, comprising:
a first directive wheel;
a second directive wheel;
a first driving device connected to the first directive wheel; and a second driving device connected to the second directive wheel;
wherein the first driving device and the second driving device are configured to separately drive the first directive wheel and the second directive wheel respectively, thus making the first directive wheel and the second directive wheel deflect in a same direction as each other to achieve steering;
wherein the first driving device comprises:
two first hydraulic cylinders distributed at a same side of the first directive wheel at an interval, wherein a piston rod of each of the two first hydraulic cylinders is connected to the first directive wheel, each of the two first hydraulic cylinders comprises a first cavity into which a liquid is fed to make the piston rod extend out and a second cavity into which the liquid is fed to make the piston rod retract;
wherein the first cavity of one of the two first hydraulic cylinders and the second cavity of another first hydraulic cylinder of the two first hydraulic cylinders are communicated with a first pipeline, and the second cavity of the another first hydraulic cylinder of the two first hydraulic cylinders and the first cavity of the another first hydraulic cylinder of the two first hydraulic cylinders are communicated with a second pipeline;
wherein the second driving device comprises:
two second hydraulic cylinders distributed at a same side of the second directive wheel at an interval, wherein a piston rod of each of the two second hydraulic cylinders is connected to the second directive wheel, each of the two second hydraulic cylinders comprises a third cavity into which the liquid is fed to make the piston rod extend out and a fourth cavity into which the liquid is fed to make the piston rod retract;
wherein the third cavity of one of the two second hydraulic cylinders and the fourth cavity of another second hydraulic cylinder of the two second hydraulics cylinders are communicated with a third pipeline, and the fourth cavity of the one of the two second hydraulic cylinders and the third cavity of the another second hydraulic cylinder of the two second hydraulics cylinders are communicated with a fourth pipeline.

* * * * *